(12) United States Patent
Choi et al.

(10) Patent No.: US 11,146,859 B2
(45) Date of Patent: Oct. 12, 2021

(54) METHOD AND APPARATUS FOR EXECUTING CONTENT

(71) Applicant: SAMSUNG ELECTRONICS CO., LTD., Suwon-si (KR)

(72) Inventors: Hyun-soo Choi, Seoul (KR); Chang-yeong Kim, Seoul (KR); Kyung-su Kim, Seoul (KR); Sung-jin Kim, Yongin-si (KR); Il-koo Kim, Seongnam-si (KR); Ju-hee Kim, Suwon-si (KR); Joon-hyun Lee, Seoul (KR); Byung-joon Chang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/646,723

(22) PCT Filed: Sep. 14, 2018

(86) PCT No.: PCT/KR2018/010821
§ 371 (c)(1),
(2) Date: Mar. 12, 2020

(87) PCT Pub. No.: WO2019/054791
PCT Pub. Date: Mar. 21, 2019

(65) Prior Publication Data
US 2020/0304883 A1    Sep. 24, 2020

(30) Foreign Application Priority Data

Sep. 15, 2017 (KR) .................. 10-2017-0118847

(51) Int. Cl.
*H04N 21/485* (2011.01)
*H04N 21/431* (2011.01)
(Continued)

(52) U.S. Cl.
CPC ....... *H04N 21/4854* (2013.01); *H04N 21/436* (2013.01); *H04N 21/4312* (2013.01);
(Continued)

(58) Field of Classification Search
CPC .......... H04N 21/4854; H04N 21/4312; H04N 21/436; H04N 21/44231; H04N 21/4666;
(Continued)

(56) References Cited

U.S. PATENT DOCUMENTS 7,961,258 B2   6/2011   Lee et al.
8,155,507 B2   4/2012   Lee
(Continued)

FOREIGN PATENT DOCUMENTS

JP    2007-13335       1/2007
KR   10-2009-0091569   8/2000
(Continued)

OTHER PUBLICATIONS

International Search Report and Written Opinion of the International Searching Authority dated Jan. 18, 2019 in International Patent Application No. PCT/KR2018/010821.
(Continued)

*Primary Examiner* — Alexander Gee
(74) *Attorney, Agent, or Firm* — Staas & Halsey LLP

(57) ABSTRACT

Provided is a method of executing content, the method including: recognizing an external electronic device connected to an electronic device; determining a type of the content provided from the external electronic device to the electronic device based on a user interface (UI) displayed on a screen of the electronic device, as the external electronic device is recognized; and determining an image quality control mode for the content based on the determined type of the content.

13 Claims, 16 Drawing Sheets

(51) Int. Cl.
*H04N 21/436* (2011.01)
*H04N 21/442* (2011.01)
*H04N 21/466* (2011.01)
*H04N 21/478* (2011.01)
*H04N 21/44* (2011.01)

(52) U.S. Cl.
CPC ... *H04N 21/44231* (2013.01); *H04N 21/4666* (2013.01); *H04N 21/4781* (2013.01)

(58) Field of Classification Search
CPC ......... H04N 21/4781; H04N 21/25825; H04N 21/47; H04N 21/482; H04N 21/431; H04N 21/44008; H04N 21/44012; H04N 21/472

See application file for complete search history.

(56) References Cited

U.S. PATENT DOCUMENTS

| | | | |
|---|---|---|---|
| 8,826,341 | B2 | 9/2014 | Jung |
| 8,934,724 | B2 | 1/2015 | Baba et al. |
| 9,202,523 | B2 | 12/2015 | Ryu et al. |
| 2010/0118198 | A1* | 5/2010 | Usui ............... H04N 21/84 348/576 |
| 2011/0221874 | A1 | 9/2011 | Oh |
| 2012/0206493 | A1 | 8/2012 | Koike et al. |
| 2018/0321951 | A1* | 11/2018 | Fitzgerald .......... G06K 9/00671 |

FOREIGN PATENT DOCUMENTS

| | | |
|---|---|---|
| KR | 10-0688650 | 3/2007 |
| KR | 10-2010-0033230 | 3/2010 |
| KR | 10-0995310 | 11/2010 |
| KR | 10-2011-0102801 | 9/2011 |
| KR | 10-2015-0141094 | 12/2015 |
| KR | 20150141094 A * | 12/2015 |
| KR | 10-1644789 | 8/2016 |
| WO | 2008/117366 | 10/2008 |

OTHER PUBLICATIONS

Korean Office Action for Korean Application No. 10-2017-0118847 dated Jun. 30, 2021.

* cited by examiner

FIG. 11
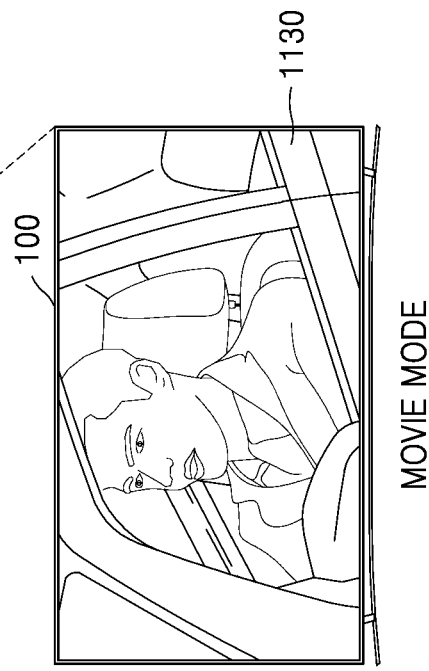
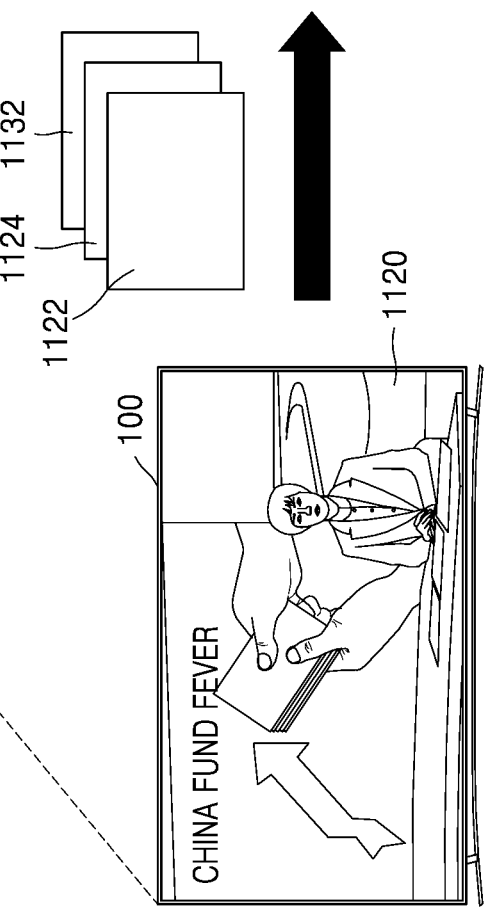

METHOD AND APPARATUS FOR EXECUTING CONTENT

CROSS-REFERENCE TO RELATED APPLICATIONS

This application is a U.S. National Stage Application which claims the benefit under 35 U.S.C. § 371 of International Patent Application No. PCT/KR2018/010821 filed on Sep. 14, 2018, which claims foreign priority benefit under 35 U.S.C. § 119 of Korean Patent Application No. 10-2017-0118847 filed on Sep. 15, 2017 in the Korean Intellectual Property Office, the contents of both of which are incorporated herein by reference.

TECHNICAL FIELD

The present disclosure relates to a method, performed by an electronic device, of executing content, a device for executing content, and a recording medium having recorded thereon a program for performing the method of executing content.

BACKGROUND ART

Recently, as televisions (TVs) interworking with the Internet or web services have appeared, various services for improving user convenience have emerged. In addition, by connecting TVs to external electronic devices, various applications provided from external electronic devices may be provided to users via TVs.

As various services have been allowed to be provided via TVs, to provide image quality suitable for services, various studies on methods of controlling image quality of TV screens have been carried out. However, according to current methods of controlling image quality, because, without automatically considering characteristics of services, an image quality control mode is set to a default value or the image quality may be controlled based on user inputs, there is an additional need for studies on a method of controlling image quality by considering characteristics of services, for user convenience.

DESCRIPTION OF EMBODIMENTS

Technical Problem

Provided is a method in which, when a second electronic device is connected to a first electronic device, the type of content executed by the second electronic device is recognized and an image quality control mode is determined according to the recognized type of the content, thereby executing content for a user by considering the type of the content.

Solution to Problem

Provided is a method of executing content includes: recognizing an external electronic device connected to an electronic device; determining a type of content provided from the external electronic device to the electronic device, based on a user interface (UI) displayed on a screen of the electronic device; and determining an image quality control mode for the content, based on the determined type of the content.

BRIEF DESCRIPTION OF DRAWINGS

FIG. 11 is a diagram illustrating a method of applying an image quality control mode when content reproduced on a first electronic device is changed, according to an embodiment.

BEST MODE

Figure 1:
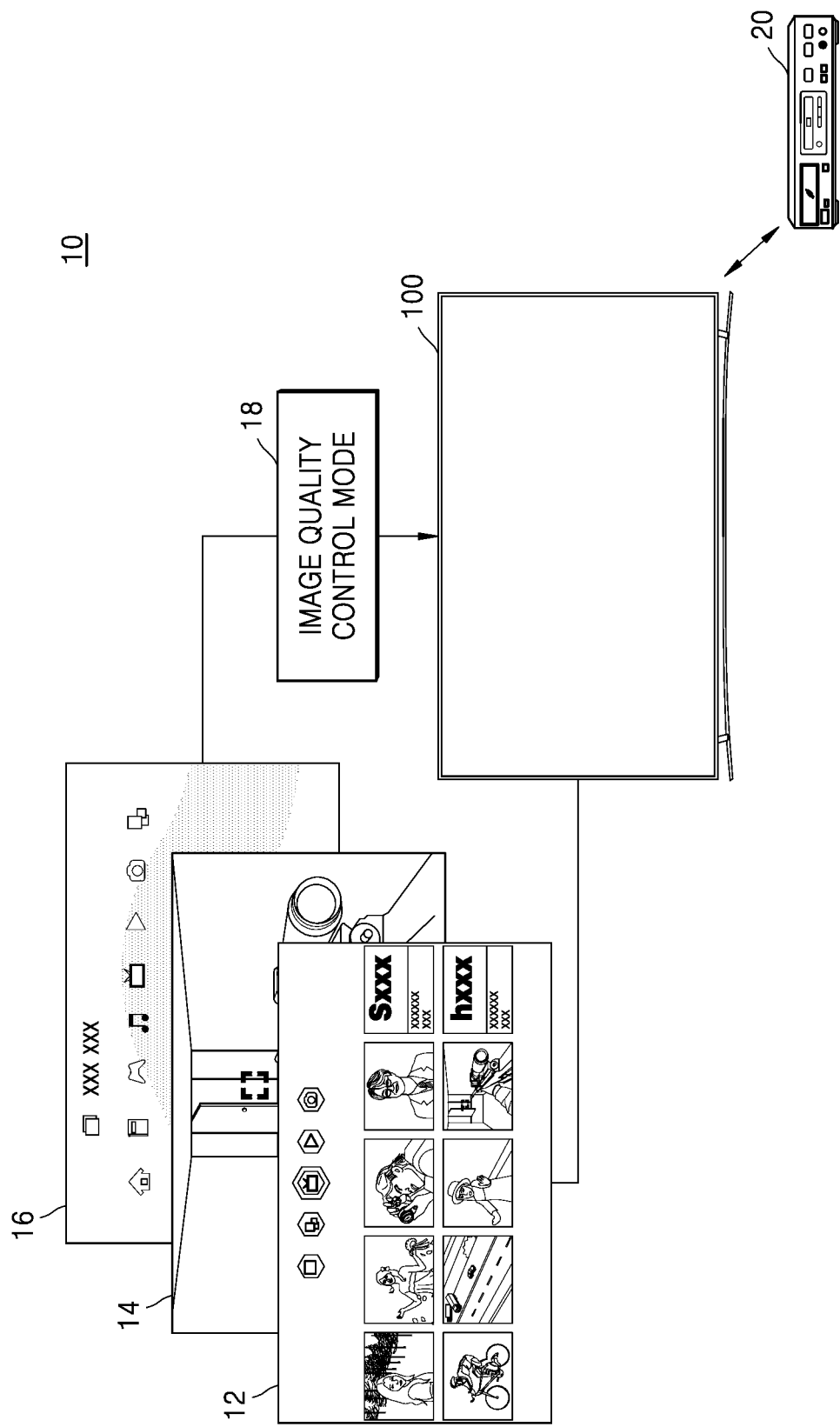
FIG. 1 is a conceptual diagram illustrating a system 10 for executing content, according to an embodiment.

According to an aspect of the present disclosure, a method of executing content includes: recognizing an external electronic device connected to an electronic device; determining a type of the content provided from the external electronic device to the electronic device, based on a user interface (UI) displayed on a screen of the electronic device, as the external electronic device is recognized; and determining an image quality control mode for the content, based on the determined type of the content.

According to an embodiment, in the method of executing content, the determining of the type of the content may include: obtaining information about at least one menu UI executable on the recognized external electronic device; and determining whether the UI displayed on the screen of the electronic device is a menu UI, based on a result of comparing the obtained information about the at least one menu UI with the UI displayed on the screen of the electronic device.

According to an embodiment, the method of executing content may further include capturing the screen of the electronic device, wherein the determining of the type of the content may include determining the type of the UI displayed on the screen of the electronic device, by using output data obtained as a result of inputting the captured screen to a pre-generated learning network model, and the learning network model may be generated as a result of the training of criteria for determining the type of UI based on at least one UI running on a plurality of external electronic devices.

According to an embodiment, in the method of executing content, the determining of the type of the content may include determining the type of the content based on the type of the recognized external electronic device, when the UI displayed on the screen does not include a menu UI.

According to an embodiment, in the method of executing content, the determining of the type of the content may include determining the content as a game, when the UI displayed on the screen does not include the menu UI and the external electronic device is recognized as a game console, and the determining of the image quality control mode may include determining the image quality control mode as a first mode in which image quality control is not performed, as the content is determined as the game.

According to an embodiment, in the method of executing content, the determining of the type of the content may include: capturing the screen of the electronic device until a time point at which an execution screen of the content is obtained, when the UI displayed on the screen includes a menu UI; and determining the type of the content based on image features of the execution screen of the content, as the execution screen of the content is obtained.

According to an embodiment, in the method of executing content, the determining of the type of the content may include determining the type of the content displayed on the screen of the electronic device by using output data obtained as a result of inputting the execution screen of the content to a pre-generated learning network model, and the learning network model may be generated as a result of training of criteria for determining the type of the content based on execution screens of a plurality of pieces of content.

According to an embodiment, in the method of executing content, the determining of the image quality control mode may include determining the image quality control mode by using output data obtained as a result of inputting the execution screen of the content to a pre-generated learning network model, and the learning network model may be generated as a result of training of criteria for determining the image quality control mode based on execution screens of a plurality of pieces of content.

According to an embodiment, the method of executing content may further include: obtaining information about a change time point at which first content running on an electronic device is changed to second content that is different in type from the first content; determining a third image quality control mode by performing an interpolation between parameter values of both a first image quality control mode determined for the first content and a second image quality control mode determined for the second content; and applying the third image quality control mode to a portion of the first content and a portion of the second content, each running for a certain time period from an earlier time point to a later time point than the change time point.

According to an embodiment, the method of executing content may further include: capturing the screen of the electronic device, as the content runs; and recognizing a plurality of objects included in the captured screen, based on image features of the captured screen, wherein the determining of the image quality control mode may include determining the image quality control mode for a region in which at least one of the plurality of objects is displayed, based on the type of the content and the recognized plurality of objects.

According to another aspect of the present disclosure, an electronic device for executing content includes: a memory storing one or more instructions; a display; an interface connecting the electronic device to an external electronic device; and a processor configured to execute the one or more instructions stored in the memory, wherein the processor is further configured to execute the one or more instructions to: recognize the external electronic device connected to the electronic device via the interface; determine a type of the content provided from the external electronic device to the electronic device based on a user interface (UI) displayed on a screen of the electronic device, as the external electronic device is recognized; and determine an image quality control mode for the content based on the determined type of the content.

Mode of Disclosure

Terms used herein will be briefly described, and then, the present disclosure will be described in detail.

Although terms used herein are of among general terms which are currently and broadly used by considering functions in the present disclosure, these terms may vary according to intentions of those of ordinary skill in the art, precedents, the emergence of new technologies, or the like. In addition, there may be terms selected arbitrarily by the applicants in particular cases, and in these cases, the meaning of those terms will be described in detail in the corresponding portions of the detailed description. Therefore, the terms used herein should be defined based on the meaning thereof and descriptions made throughout the specification, rather than based on names simply called.

It will be understood that, throughout the specification, when a region such as an element, a component, a layer, or the like is referred to as "comprising" or "including" a component such as an element, a region, a layer, or the like, the region may further include another component in addition to the component rather than excludes the other component, unless otherwise stated. In addition, the term such as " . . . unit", " . . . portion", " . . . module", or the like used herein refers to a unit for processing at least one function or operation, and this may be implemented by hardware, software, or a combination of hardware and software.

Hereinafter, embodiments of the present disclosure will be described in detail with reference to the accompanying drawings, such that one of ordinary skill in the art is allowed to readily make implementations thereof. However, it should be understood that the present disclosure may be embodied in various different ways and is not limited to the following embodiments. In addition, portions irrelevant to the description are omitted from the drawings for clarity, and like components will be denoted by like reference numerals throughout the specification.

FIG. 1 is a conceptual diagram illustrating a system 10 for executing content, according to an embodiment.

Referring to FIG. 1, the system 10 for executing content may include a first electronic device 100 and a second electronic device 20. However, this is merely an example, and components of the system 10 for executing content are not limited to the first electronic device 100 and the second electronic device 20.

In addition, herein, the first electronic device 100 and the second electronic device 20 may be respectively referred to as an electronic device and an external electronic device.

The first electronic device 100 may execute at least one type of content. Here, although content may include multimedia such as a movie, news, a drama, and a game, these are merely examples, and the content according to an embodiment is not limited to the examples set forth above. In addition, in the examples set forth above, each of the movie, the news, the drama, and game corresponds to a type of content, and the type of content may be classified according to characteristics of information (for example, details of the information, a transfer method of the information, and the like) included in the content. However, the examples set forth above are merely examples of the type of content, and the type of content may be further subdivided. For example, the type of content may be classified into a romance movie, a horror movie, a comedy movie, and the like.

The first electronic device 100 according to an embodiment may obtain at least one type of content from the second electronic device 20 through connection to the second electronic device 20. The first electronic device 100 may be connected to the second electronic device 20 by wire or wirelessly. For example, the first electronic device 100 may be connected to the second electronic device 20 via at least one of a high definition multimedia interface (HDMI) cable, a digital visual interface (DVI) cable, and an RGB cable. According to another example, the first electronic device 100 may be connected to the second electronic device 20 through wireless communication such as WiFi, Bluetooth, or the like.

In addition, the first electronic device 100 may recognize the type of the second electronic device 20 connected to the first electronic device 100. For example, when the first electronic device 100 is connected to a game console via an HMDI cable, the first electronic device 100 may recognize that the second electronic device 20 connected to the first electronic device 100 is a game console, by receiving identification information of the game console via the HMDI cable. According to another example, when the first electronic device 100 is connected to a smart phone through WiFi, the first electronic device 100 may recognize that the second electronic device 20 connected to the first electronic device 100 is a smart phone, by receiving identification information of the smart phone through WiFi connection.

As the first electronic device 100 is connected to the second electronic device 20, the first electronic device 100 may obtain at least one user interface (UI) 12, 14, or 16. Here, the at least one user interface (UI) 12, 14, or 16 may include a menu UI 12 or 16, a content execution UI 14, and the like. The content execution UI 14 may represent a screen displayed on the first electronic device 100 according to content execution.

According to the type of content provided from the second electronic device 20 to the first electronic device 100, when the second electronic device 20 is connected to the first electronic device 100, a UI provided from the first electronic device 100 may be determined. For example, when the content provided from the second electronic device 20 is a game, a game execution UI may be displayed on the first electronic device 100. According to another example, when the content provided from the second electronic device 20 is a movie, a drama, or the like, a menu UI may be displayed on the first electronic device 100. Accordingly, when connected to the second electronic device 20, the first electronic device 100 may determine the type of the content provided to the first electronic device 100 based on a UI provided from the second electronic device 20.

In addition, according to another example, when the first electronic device 100 does not determine the type of the content from a UI provided first upon the connection to the second electronic device 20, the first electronic device 100 may determine the type of the content by analyzing image features of a content execution screen captured after executing the content. For example, the first electronic device 100 may determine the type of the content by using a learning network model that is pre-generated based on the image features of the content execution screen. In the present embodiment, the image features may include, but are not limited to, a color, an edge, a polygon, saturation, and brightness constituting the captured screen, the type and position of text shown in the screen, the type and arrangement of an object included in the screen, and the like.

When the first electronic device 100 reproduces the content obtained from the second electronic device 20, the first electronic device 100 may execute an image quality control mode for providing the content having more improved image quality. The image quality control mode may be determined according to parameter values representing display characteristics such as a color, saturation, brightness, distinctness, and contrast of the screen. For example, according to the type of the content, when reproduction without interruption is a top priority in the content, there may be deterioration in quality of service (QoS) in some cases due to the execution of the image quality control mode. Accordingly, the first electronic device 100 may determine whether to perform image quality control, according to the determined type of the content.

In addition, according to another embodiment, when the type of the content is determined, the first electronic device 100 may select an image quality control mode suitable for the type of the content. For example, when the type of the content corresponds to news, the first electronic device 100 may select an image quality control mode for controlling a color, an edge, or the like of the screen such that text or the like may be clearly viewed.

Although the first electronic device 100 according to an embodiment may include at least one of an audio/video (A/V) apparatus, a monitor, a tablet, a smart phone, and a wearable device, these are merely examples, and the first electronic device 100 is not limited to the examples set forth above. In addition, although the second electronic device 20 according to another embodiment may include a set-top box, a digital versatile disc (DVD) player, or the like, these are merely examples, and the second electronic device 20 is not limited to the examples set forth above.

Figure 2:
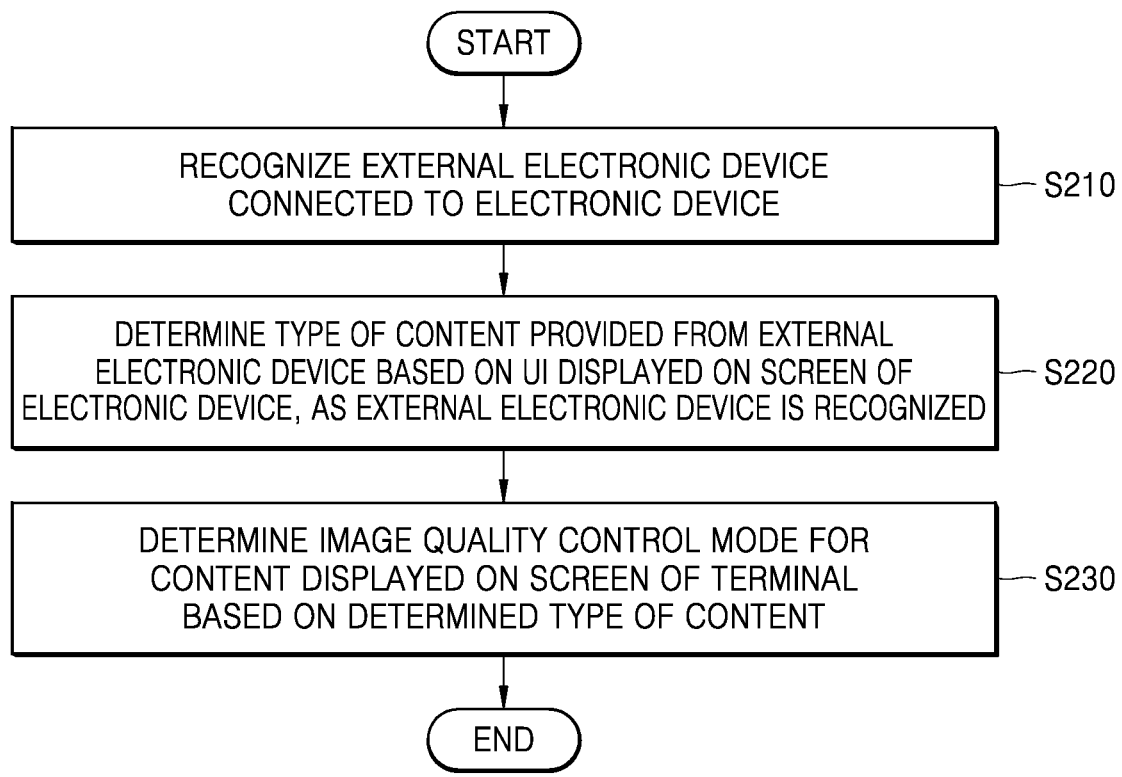
FIG. 2 is a flowchart illustrating a method by which an electronic device executes content, according to an embodiment.

FIG. 2 is a flowchart illustrating a method by which an electronic device executes content, according to an embodiment.

In operation S210, an electronic device may recognize an external electronic device connected to the electronic device. The electronic device may be connected to the external electronic device through a wired or wireless connection. The electronic device may recognize the external electronic device by receiving identification information of the external electronic device through a wired or wireless connection. For example, when connected to a P game console via an HDMI cable, the electronic device may recognize that the P game console is connected to the electronic device, by receiving identification information of the P game console via the HDMI cable.

In operation S220, as the external electronic device is recognized, the electronic device may determine the type of content provided from the external electronic device, based on a UI displayed on a screen of the electronic device. The electronic device may be provided with the UI from the external electronic device.

The UI provided from the external electronic device may vary according to the type of the content provided from the external electronic device to the electronic device. Therefore, the electronic device may determine the type of the content through the UI provided from the external electronic device.

A method by which the electronic device determines the type of the content based on the UI provided from the external electronic device will be described below in more detail with reference to FIGS. 3 to 7.

In operation S230, the electronic device may determine an image quality control mode for the content, based on the determined type of the content. There may be an optimized image quality control mode according to the type of the content. For example, a game is content in which reproduction without interruption is considered significant, and a top priority may be put on providing content without interruption rather than on good image quality.

Accordingly, when the content provided to the electronic device is a game, the electronic device may not perform image quality control to provide the game without interruption. On the other hand, in the case of a movie or a drama, a top priority may be put on providing good image quality to a user rather than on reproduction without interruption. Accordingly, when the content provided to the electronic device is a movie or a drama, the electronic device may perform image quality control before displaying the content on the screen thereof.

In addition, the electronic device may identify types of pieces of content requiring image quality control and thus differently set an image quality control mode for each piece of content. For example, the electronic device may perform image quality control by applying different image quality control values to different pieces of content, such as news, a movie, and the like. In the case of news, as exact information delivery is required, the electronic device may perform image quality control to increase the contrast of the screen thereof such that text is able to be clearly displayed. On the other hand, in the case of a drama, the electronic device may perform image quality control for increasing brightness such that a person may be clearly viewed.

Even for the same type of content, the electronic device may further divide the type of the content into sub-categories according to settings, and thus, may set different image quality control modes. For example, for content A and content B both corresponding to dramas, the electronic device may select an image quality control mode for setting a high color temperature for the content A, which falls within a romance genre, and may also select an image quality control mode for setting a low color temperature for the content B, which falls within a horror genre.

Figure 3:
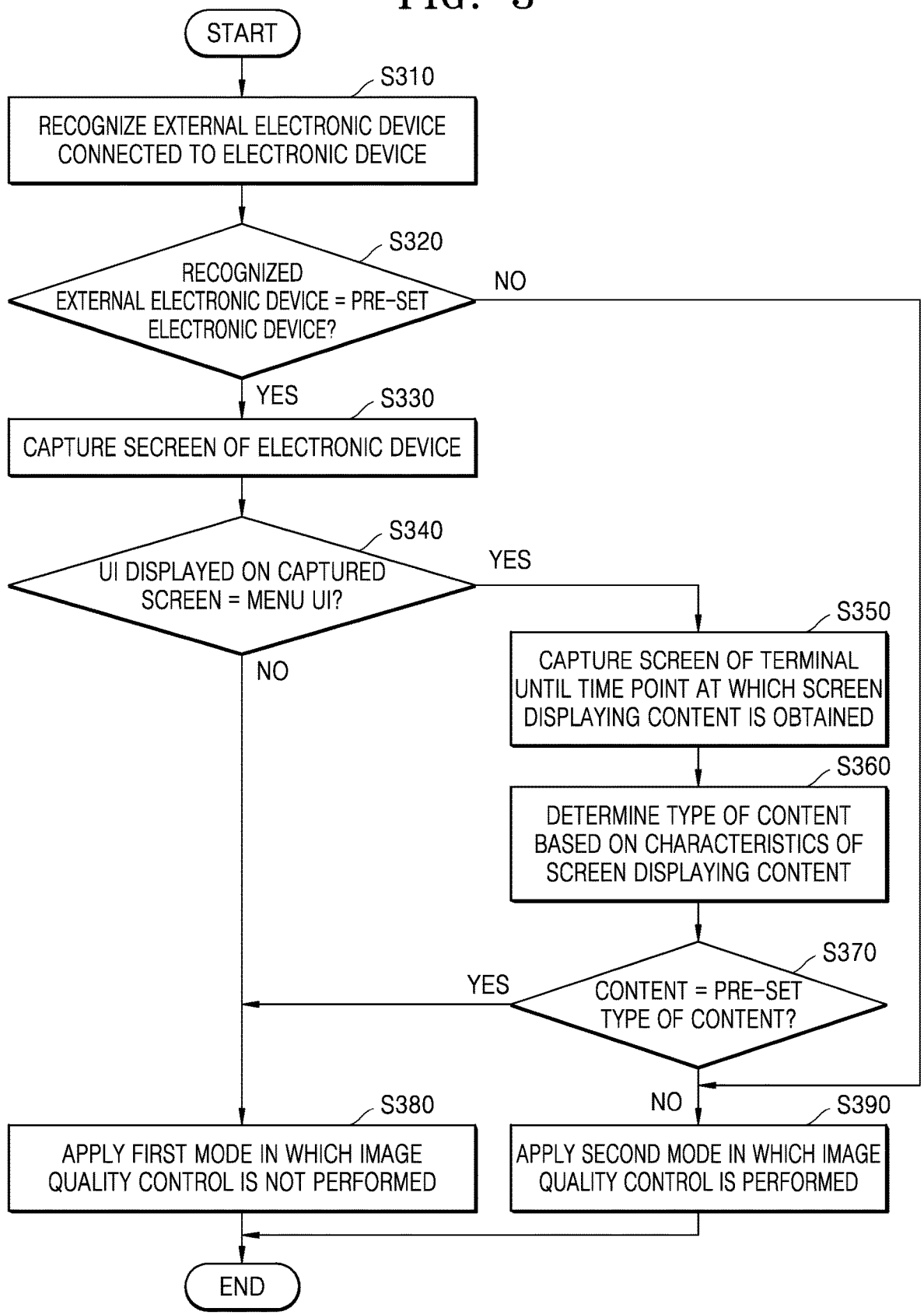
FIG. 3 is a flowchart more specifically illustrating a method by which an electronic device controls image quality by recognizing the type of content provided from an external electronic device, according to an embodiment.

FIG. 3 is a flowchart more specifically illustrating a method by which an electronic device controls image quality by recognizing the type of content provided from an external electronic device, according to an embodiment.

In the embodiment of FIG. 3, it is assumed that an image quality control mode of a first electronic device includes a first mode, in which image quality control is not performed, and a second mode, in which image quality control is performed.

In operation S310, the electronic device may recognize the external electronic device connected to the electronic device.

Operation S310 may correspond to operation S210 described above with reference to FIG. 2.

In operation S320, the electronic device may determine whether the recognized external electronic device is a pre-set external electronic device. For example, the electronic device may determine whether the recognized external electronic device is an external electronic device capable of providing a game. The first mode for not performing image quality control needs to be set for games, whereas the second mode for performing image quality control needs to be set for other pieces of content except for games. Accordingly, the electronic device may determine whether the external electronic device is an external electronic device capable of providing a game.

However, this is merely an example, and the criteria for the electronic device to determine the external electronic device are not limited to whether a game is provided or not.

In operation S330, the electronic device may capture a screen of the electronic device.

When the recognized external electronic device is a pre-set external electronic device, the electronic device according to an embodiment may capture the screen of the electronic device. For example, when the recognized external electronic device is an external electronic device capable of providing a plurality of types of content including games, the electronic device may capture the screen of the electronic device, in order to determine the type of content provided from the external electronic device.

In operation S320 described above, when the external electronic device connected to the electronic device is an external electronic device not providing a game, the electronic device may apply, to the content, the second mode for performing image quality control as the image quality control mode of the electronic device, without performing a process of capturing the screen of the electronic device.

In operation S340, the electronic device may determine whether a UI displayed on the captured screen is a menu UI. Here, it is assumed that a game execution UI is displayed on the screen when a game is provided to the electronic device and that a menu UI is displayed on the screen when a movie, a drama, or the like is provided to the electronic device. Therefore, to determine whether the type of the content provided to the electronic device is a game, the electronic device may determine whether the UI displayed on the captured screen is a menu UI.

The electronic device according to an embodiment may determine whether the UI displayed on the captured screen is the menu UI, by analyzing a layout of the captured screen. For example, the electronic device may determine whether the UI displayed on the captured screen is the menu UI, by comparing the layout of the captured screen with a template including information about a layout of the menu UI.

The electronic device according to another embodiment may determine whether the UI displayed on the captured screen is the menu UI, by applying the captured screen, as input data, to a learning network model that is pre-generated as a result of training of image features of the menu UI.

However, this is merely an example, and a method by which the electronic device determines whether the captured screen corresponds to the menu UI is not limited to the example set forth above.

In operation S350, the electronic device may capture the screen of the electronic device until a time point at which a content execution screen is obtained.

When the UI displayed on the captured screen is the menu UI, the electronic device according to an embodiment may capture the screen of the electronic device until the time point at which the content execution screen is obtained. For example, the electronic device may periodically capture the screen of the electronic device and may determine whether the content execution screen not corresponding to the menu UI is obtained, by comparing the menu UI with at least one captured screen.

In operation S360, the electronic device may determine the type of the content, based on image features of the content execution screen.

The electronic device according to an embodiment may determine the type of the content by recognizing an image, text, or the like displayed on the content execution screen. For example, the electronic device may recognize that the type of the content is a movie, by recognizing a channel name shown in an upper-left portion of the captured screen. According to another example, the electronic device may recognize a person in the captured screen and may recognize that the type of the content is a drama, by comparing information of an electronic program guide (EPG) with information of a program in which the recognized person appears.

The electronic device according to another embodiment may determine the type of the content by applying the captured content execution screen, as an input value, to a learning network model that is pre-generated as a result of training of image features of each type of content. However, this is merely an example, and a method, in which the electronic device determines the type of the content through the captured content execution screen, is not limited to the example set forth above.

In operation S370, the electronic device may determine whether the determined content is a pre-set type of content. For example, the electronic device may determine whether the determined content is a game.

In operation S380, the electronic device may apply the first mode, in which image quality control is not performed, to the content.

In operation S340 described above, when the UI shown in the captured screen is not the menu UI, the electronic device may determine that the content provided from the external electronic device is a game. Accordingly, the electronic device may apply the first mode, in which image quality control is not performed, to the content. In addition, in operation S370 described above, when it is determined that the content provided from the external electronic device is a game, the electronic device may apply the first mode, in which image quality control is not performed, to the content.

Accordingly, the electronic device may provide a game execution screen by considering characteristics of a game, in which a top priority is put on providing content without interruption rather than on image quality.

In operation S390, the electronic device may apply the second mode, in which image quality control is performed, to the content.

In operation S320 described above, when the recognized external electronic device does not provide a game, the electronic device may apply the second mode, in which image quality control is performed, to the content. In operation S370 described above, when it is determined that the content provided from the external electronic device is not a game, the electronic device may apply the second mode, in which image quality control is performed, to the content.

Figure 4:
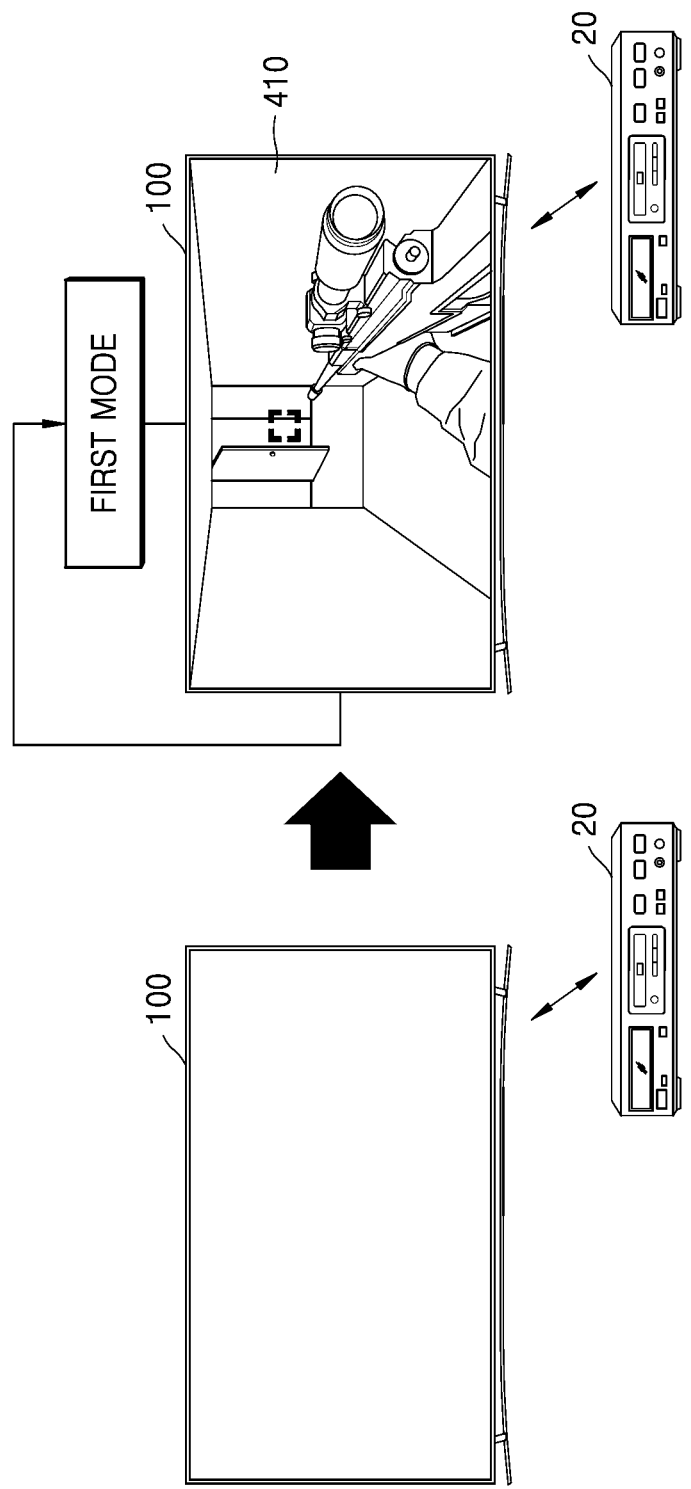
FIG. 4 is a diagram illustrating a method by which, when a captured screen of a first electronic device is not a menu user interface (UI), the first electronic device determines an image quality control mode, according to an embodiment.

FIG. 4 is a diagram illustrating a method by which, when a captured screen of the first electronic device is not a menu UI, a first electronic device determines an image quality control mode, according to an embodiment.

Referring to FIG. 4, the first electronic device 100 may recognize the second electronic device 20 connected to the first electronic device 100. For example, the first electronic device 100 may recognize that the second electronic device 20 connected to the first electronic device 100 is a P game console. In the present embodiment, the P game console is assumed to be able to provide a plurality of types of content such as a game, a movie, and a drama.

Before determining an image quality control mode, to determine the type of content provided from the second electronic device 20, the first electronic device 100 according to an embodiment may determine whether a UI provided from the second electronic device 20 is a menu UI. By capturing and analyzing the screen of the first electronic device 100 after the first electronic device 100 is connected to the second electronic device 20, the first electronic device 100 may determine whether the UI provided from the second electronic device 20 is the menu UI.

For example, the first electronic device 100 may analyze a captured screen (captured screen image ?) 410 by using a pre-stored menu UI template. By comparing the captured screen 410 with a template for at least one menu UI capable of being provided from the recognized second electronic device 20, the first electronic device 100 may determine whether the captured screen 410 includes the menu UI.

According to another example, the first electronic device 100 may analyze the captured screen 410 by using a pre-generated learning network model. A method of determining, by using the learning network model, whether the captured screen 410 is the menu UI will be described below in more detail with reference to FIG. 7.

When the UI included in the captured screen 410 is not the menu UI, the first electronic device 100 may determine that the content provided from the second electronic device 20 is a game. Accordingly, the first electronic device 100 may apply the first mode, in which image quality control is not performed, to the content.

Figure 5:
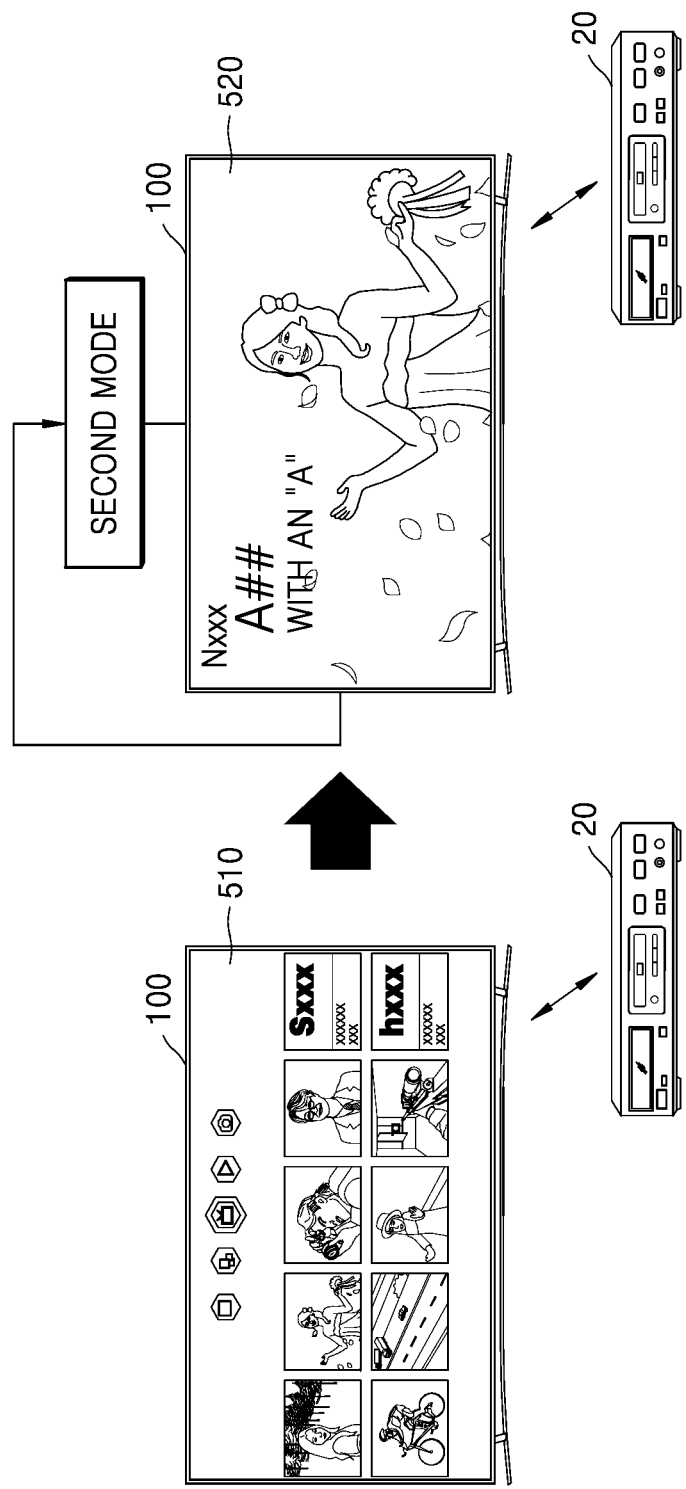
FIG. 5 is a diagram illustrating a method by which, when a captured screen of a first electronic device is a menu UI, the first electronic device determines an image quality control mode, according to an embodiment.

FIG. 5 is a diagram illustrating a method by which, when a captured screen of a first electronic device is a menu UI, the first electronic device determines an image quality control mode, according to an embodiment.

Referring to FIG. 5, the first electronic device 100 may recognize the second electronic device 20 connected to the first electronic device 100. Like the second electronic device 20 described above with reference to FIG. 4, the second electronic device 20 of the present embodiment is assumed to be able to provide a plurality of types of content such as a game, a movie, and a drama.

Before determining an image quality control mode, to determine the type of content provided from the second electronic device 20, the first electronic device 100 according to an embodiment may determine whether a UI provided from the second electronic device 20 is a menu UI. For example, by capturing and analyzing the screen of the first electronic device 100 after the first electronic device 100 is connected to the second electronic device 20, the first electronic device 100 may determine whether the UI provided from the second electronic device 20 is the menu UI.

As a result of analyzing a captured screen 510, the first electronic device 100 may confirm that the UI provided from the second electronic device 20 is the menu UI. Accordingly, the first electronic device 100 may repeatedly capture the screen thereof until a time point at which a content execution screen is obtained after the menu UI disappears.

As a content execution screen 520 is captured by the first electronic device 100, the first electronic device 100 may determine the type of the content by analyzing the content execution screen 520. As a result of analyzing the content execution screen 520, when text, such as a service name, a title, and the like, and a person are recognized, the first electronic device 100 may determine that the content provided from the second electronic device 20 is a drama.

Accordingly, the first electronic device 100 may apply the second mode, in which image quality control is performed, to the content provided from the second electronic device 20.

Figure 6:
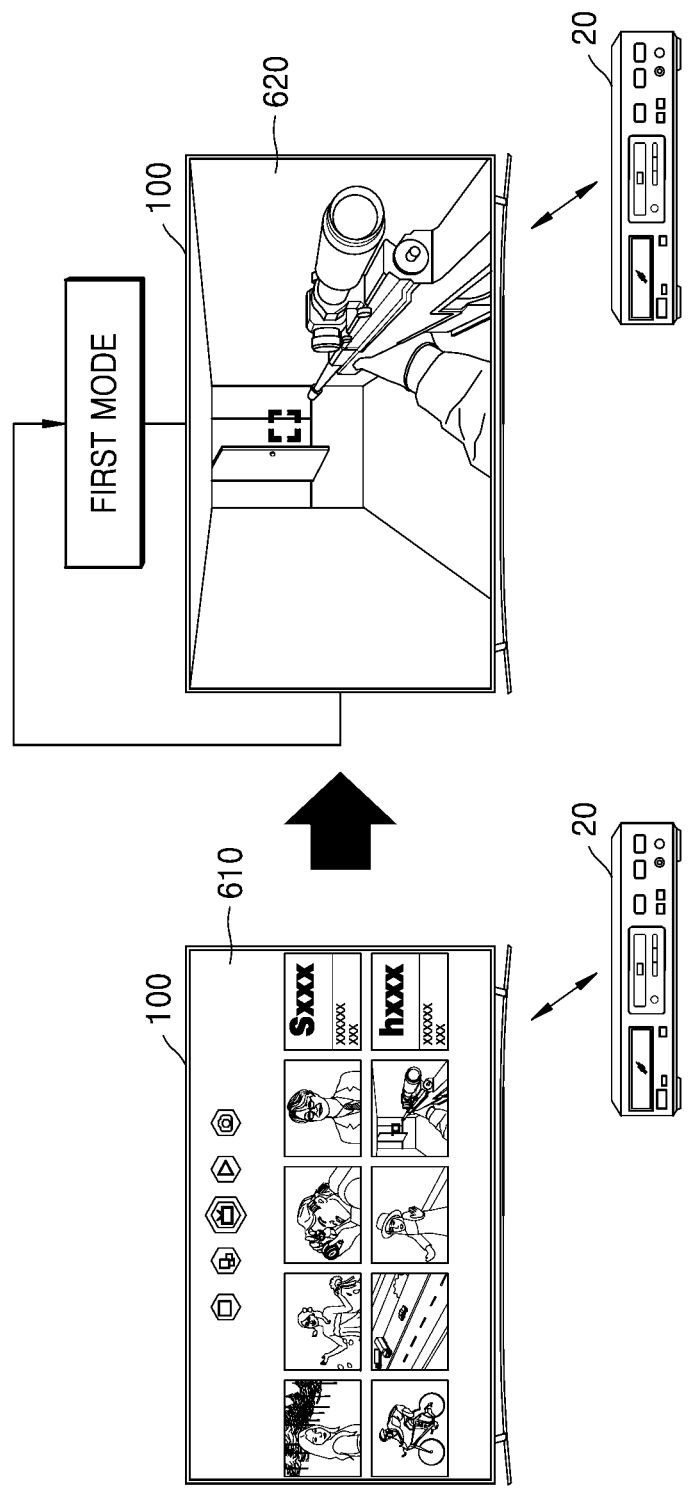
FIG. 6 is a diagram illustrating a method by which, when a captured screen of a first electronic device is a menu UI, the first electronic device determines an image quality control mode, according to another embodiment.

FIG. 6 is a diagram illustrating a method by which, when a captured screen of the first electronic device 100 is a menu UI, the first electronic device 100 determines an image quality control mode, according to another embodiment.

Referring to FIG. 6, the first electronic device 100 may recognize the second electronic device 20 connected to the first electronic device 100. The second electronic device 20 of the present embodiment is assumed to be able to provide a plurality of types of content such as a game, a movie, and a drama. A captured screen 610 of the first electronic device 100 is assumed to include a menu UI.

As a result of analyzing the captured screen 610, the first electronic device 100 may confirm that a UI provided from the second electronic device 20 is the menu UI. Accordingly, the first electronic device 100 may repeatedly capture the screen thereof until a time point at which a content execution screen is obtained after the menu UI disappears.

As a content execution screen 620 is captured by the first electronic device 100, the first electronic device 100 may determine the type of the content by analyzing the content execution screen 620. As a result of analyzing the content execution screen 620, when text such as a user's nickname or the like is recognized and a muzzle of a gun in a central region of the content execution screen 620 is also recognized, the first electronic device 100 may determine that the content provided from the second electronic device 20 is a game.

Accordingly, the first electronic device 100 may apply the first mode, in which image quality control is not performed, to the content provided from the second electronic device 20.

Figure 7:
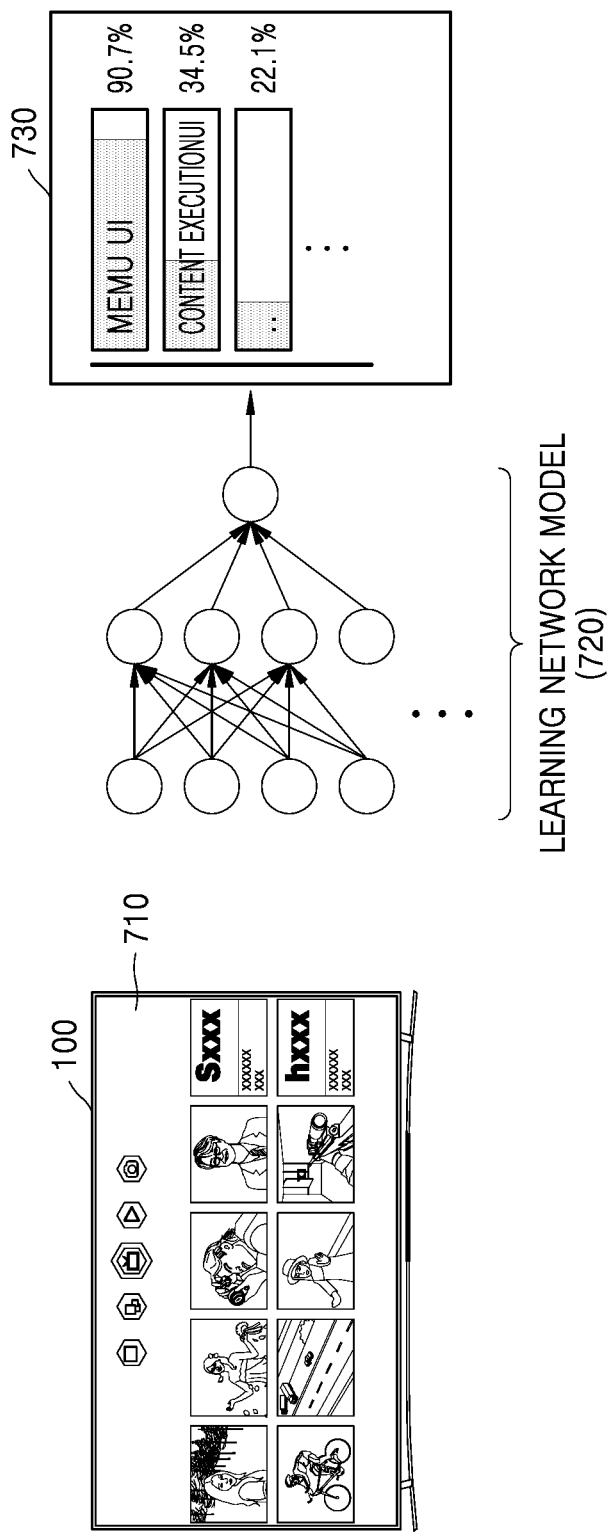
FIG. 7 is a diagram illustrating a method by which a first electronic device analyzes a captured screen by using a pre-generated learning network model, according to an embodiment.

FIG. 7 is a diagram illustrating a method by which the first electronic device 100 analyzes a captured screen 710 by using a pre-generated learning network model 720, according to an embodiment.

Referring to FIG. 7, as the second electronic device (not shown) is connected to the first electronic device 100, the first electronic device 100 may capture the screen thereof, on which a UI provided from the second electronic device (not shown) is displayed. The first electronic device 100 may determine whether the captured screen includes a menu UI, by applying the captured screen, as input data, to the pre-generated learning network model 720.

In the present embodiment, the pre-generated learning network model 720 may be an algorithm set for identifying and/or determining whether a captured screen corresponds to a menu UI, by performing extraction and combination of various image features in the menu UI by using a result of statistical machine learning. In addition, the learning network model 720 may be implemented by software, an engine, or the like for executing the aforementioned algorithm set.

The learning network model 720 may determine whether the captured screen 710 corresponds to the menu UI, by abstracting various image features included in the captured screen 710 that is input to the learning network model 720. In this case, the abstracting of the image features in the captured screen may refer to detecting the image features from the captured screen and determining core features from among the detected image features.

By applying the captured screen 710 as input data for the learning network model 720, the first electronic device 100 may obtain, as output data, a probability value 730 that the captured screen 710 corresponds to a particular UI. When the probability that the captured screen 710 corresponds to the menu UI has a highest value, the first electronic device 100 may determine that the captured screen 710 includes the menu UI.

According to another example, to reduce the amount of calculations, the first electronic device 100 may extract a particular region from the captured screen 710 and thus apply the extracted particular region as input data for the learning network model 720. For example, the first electronic device 100 may apply a central portion of the captured screen 710 as input data for the learning network model 720, based on the fact that a menu indication is generally arranged in a central region in a menu UI.

Figure 8:
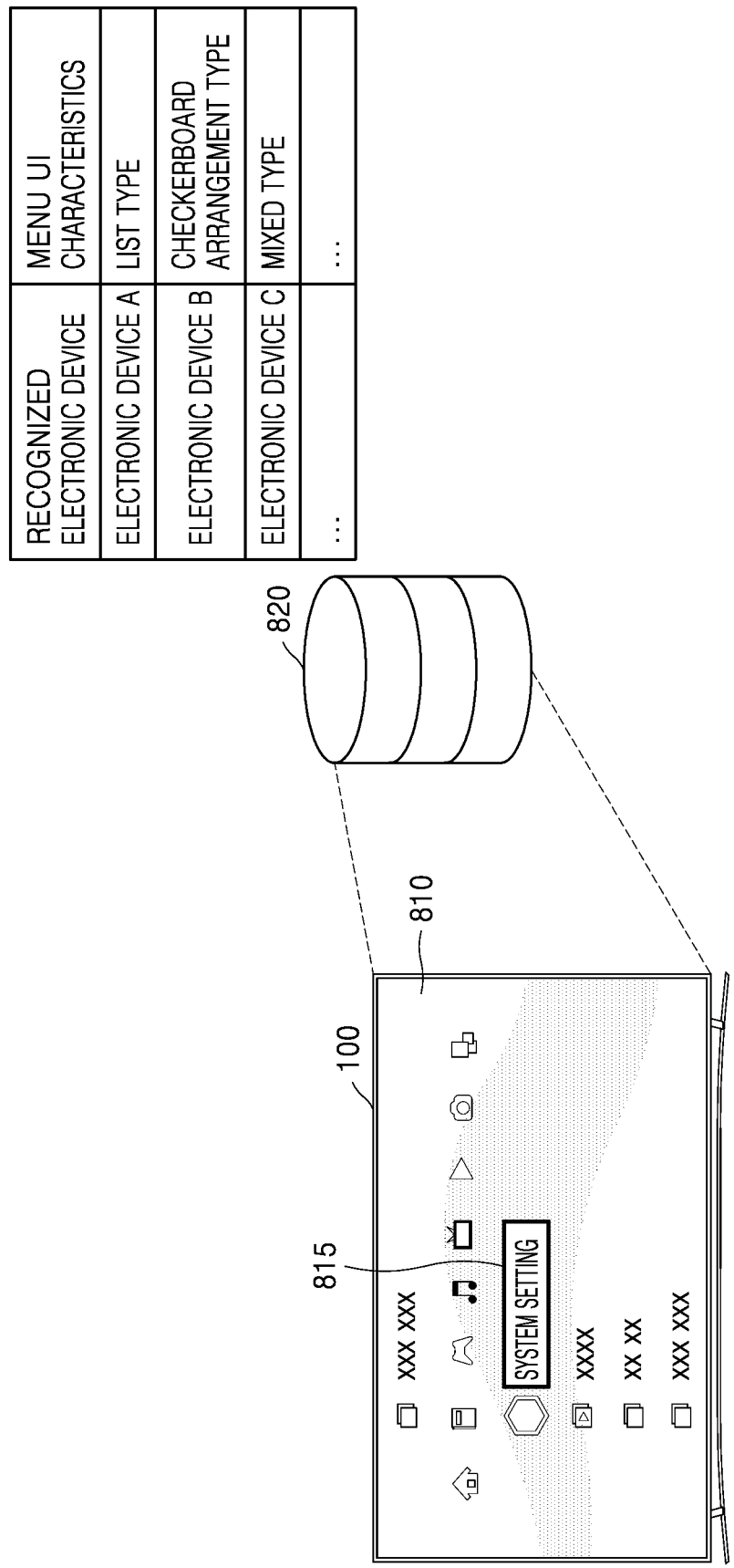
FIG. 8 is a diagram illustrating a method by which a first electronic device analyzes a captured screen by using a pre-generated user interface (UI) database, according to an embodiment.

FIG. 8 is a diagram illustrating a method by which the first electronic device 100 analyzes a captured screen 810 by using a pre-generated UI database 820, according to an embodiment.

Referring to FIG. 8, as a second electronic device (not shown) is recognized, the first electronic device 100 may capture the screen of the first electronic device 100. To determine whether the captured screen 810 is a menu UI, the first electronic device 100 may compare the captured screen 810 with menu UI information included in the pre-generated UI database 820. The UI database 820 may include information about image features of a menu UI for each second electronic device. For example, the UI database 820 may include information indicating that a menu UI of an electronic device A, a menu UI of an electronic device B, and a menu UI of an electronic device C respectively correspond to a list type, a checkerboard arrangement type, and a mixed type.

The first electronic device 100 may obtain information about image features of a menu UI corresponding to the second electronic device (not shown) from the UI database 820, based on a result of the recognition of the second electronic device (not shown). The first electronic device 100 may determine whether the captured screen 810 includes the menu UI, by comparing the captured screen 810 with the obtained information.

According to another embodiment, the UI database 820 may include information about text, images, and an arrangement of the text and the images, which are included in the menu UI for each electronic device. For example, the first electronic device 100 may obtain, from the UI database 820, information indicating that text 815 marked as "system setting" is shown in a central region of the menu UI of the second electronic device (not shown). Accordingly, the first electronic device 100 may determine whether the captured screen 810 includes the menu UI, by identifying whether the text 815 marked as "system setting" is shown in the central region of the captured screen 810.

However, this is merely an example, and information included in the UI database 820 is not limited to the examples set forth above.

Figure 9:
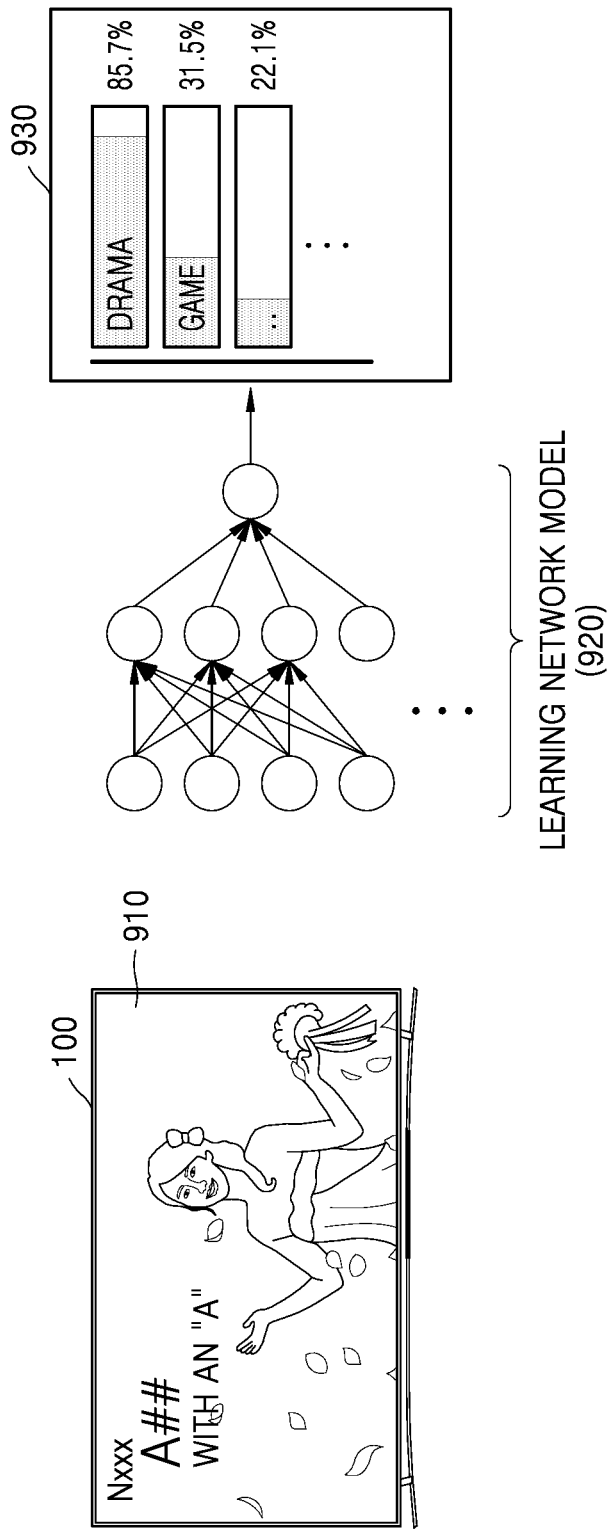
FIG. 9 is a diagram illustrating a method by which a first electronic device determines the type of content included in a captured screen by using a pre-generated learning network model, according to an embodiment.

FIG. 9 is a diagram illustrating a method by which the first electronic device 100 determines the type of content included in a captured screen 910 by using a pre-generated learning network model 920, according to an embodiment.

Referring to FIG. 9, the first electronic device 100 may determine the type of the content displayed on the screen of the first electronic device 100, by applying the captured screen 910 as input data for the pre-generated learning network model 920. For example, image features of the captured screen 910 may be applied as input data for the learning network model 920. The learning network model 920 according to an embodiment may be generated as a result of training of criteria for determining the type of the content, based on a content execution screen that is obtained as a result of executing pieces of content respectively provided from a plurality of second electronic devices.

In the present embodiment, the image features may include, but are not limited to, a color, an edge, a polygon, saturation, and brightness constituting the captured screen, the type and position of text shown in the screen, the type and arrangement of an object included in the screen, and the like.

By applying the captured screen 910 as input data for the learning network model 920, the first electronic device 100 may obtain, as output data, a probability value 930 that the content shown in the captured screen 910 corresponds to particular content. When the probability that the captured screen 910 corresponds to a drama has a highest value, the first electronic device 100 may determine that the content shown in the captured screen 910 is a drama.

According to another example, to reduce the amount of calculations, the first electronic device 100 may extract a particular region from the captured screen 910 and thus apply the extracted particular region as input data for the learning network model 920. For example, image features of the extracted particular region may be applied as input parameters for the learning network model 920.

Figure 10:
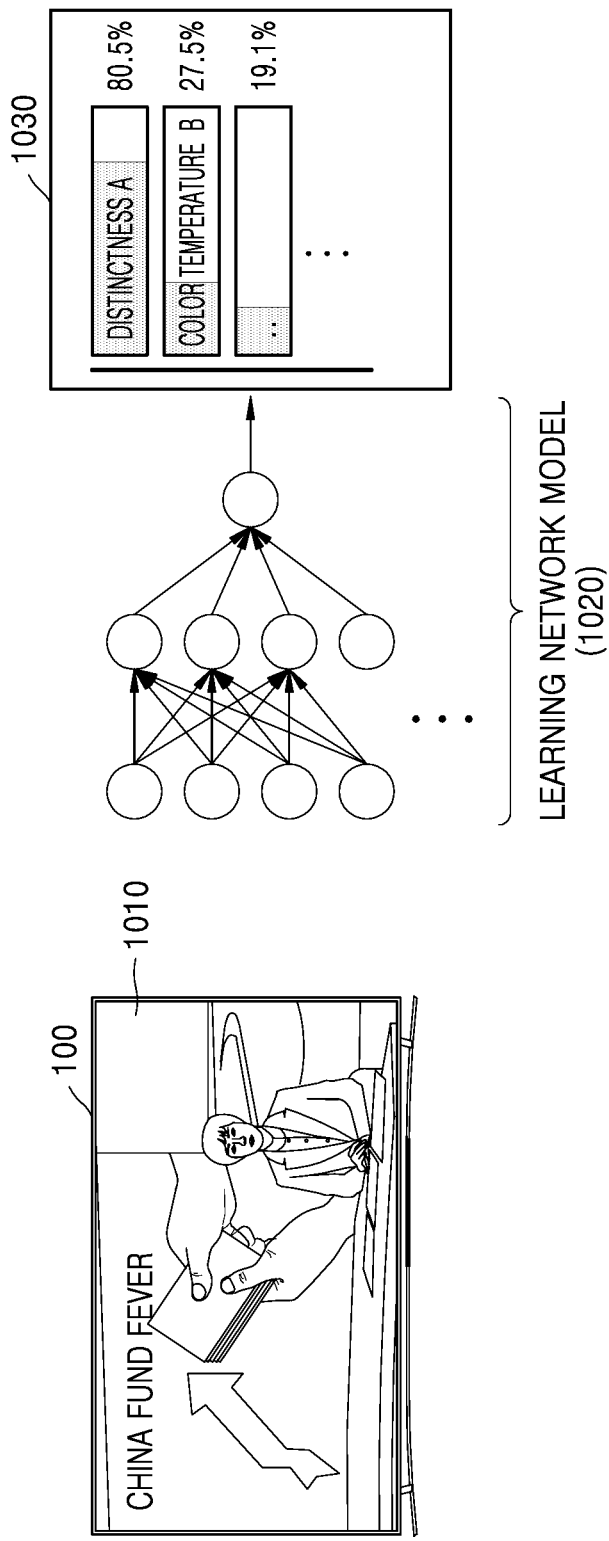
FIG. 10 is a diagram illustrating a method by which a first electronic device determines an image quality control mode by using a pre-generated learning network model, according to an embodiment.

FIG. 10 is a diagram illustrating a method by which the first electronic device 100 determines an image quality control mode by using a pre-generated learning network model 1020, according to an embodiment.

Referring to FIG. 10, the first electronic device 100 may determine an image quality control mode suitable for content displayed on the screen of the first electronic device 100, by applying a captured screen 1010 as input data to the pre-generated learning network model 1020. The learning network model 1020 according to an embodiment may be generated as a result of training of criteria for determining an image quality control mode, based on a content execution screen captured during the reproduction of at least one piece of content provided from a respective plurality of second electronic devices. For example, image features of the captured screen 1010 may be applied as input parameters for the learning network model 1020. Here, the image quality control mode may be determined according to parameter values indicating display characteristics such as a color, saturation, brightness, distinctness, and contrast of the screen.

As each piece of content has different characteristics, the image quality control mode allowing quality of service (QoS) of each piece of content to be maximized may be different. For example, in the case of content such as news or the like for which information delivery is considered significant, to clearly deliver information included in the content, the QoS of the content may be maximized by controlling the distinctness to a value equal to or greater than "a" that is a pre-set value Accordingly, when the first electronic device 100 inputs, to the learning network model 1020, image features of the screen showing news, the first electronic device 100 may obtain, from the learning network model 1020, output data prompting to adjust the distinctness of the screen to "a". Here, the output data may be obtained as a probability value for each image quality control mode, and an image quality control mode having a highest probability value may be determined as an optimum image quality control mode. However, this is merely an example, and the output data may be output in a different form from a probability value.

According to another example, to reduce the amount of calculations, the first electronic device 100 may extract a particular region from the captured screen 1010 and thus apply the extracted particular region as input data for the learning network model 1020. For example, image features of the extracted particular region may be applied as input parameters for the learning network model 1020.

FIG. 11 is a diagram illustrating a method of applying an image quality control mode when content reproduced on the first electronic device 100 is changed, according to an embodiment.

Referring to FIG. 11, as news is reproduced, the first electronic device 100 may determine the image quality control mode as a news mode. For example, by inputting, to a learning network model, image features of a screen 1120 on which news is reproduced, the first electronic device 100 may obtain, as output data, a news mode optimized for news. Here, the news mode is assumed to be an image quality control mode for adjusting the distinctness of the screen to "a". Accordingly, the first electronic device 100 may provide a screen with the distinctness adjusted to "a", according to the news mode.

In addition, as the content reproduced on the first electronic device 100 is changed, the image quality control mode of the first electronic device 100 may be changed. For example, as a movie is reproduced after the reproduction of news is terminated, the first electronic device 100 may change the image quality control mode from the news mode to a movie mode. Here, the movie mode is assumed to be an image quality control mode for adjusting the color temperature of the screen to "b". The first electronic device 100 may obtain information about a time point at which the reproduction of the movie starts after the reproduction of the news is terminated, by using pre-obtained information about an EPG 1110.

When the first electronic device 100 changes the image quality control mode according to a change of content, characteristics of the screen may be significantly changed, and thus, a user may feel foreign in viewing content. Thus, the first electronic device 100 according to an embodiment may apply the image quality control mode obtained by applying interpolation between display characteristics of both the news mode and the movie mode to some frames 1122 and 1124 of the news and some frames 1132 of the movie.

That is, when the distinctness and color temperature are respectively set to "a" and "b" in the news mode, and when the distinctness and color temperature are respectively set to "c" and "d" in the movie mode, the first electronic device 100 may apply, for example, an image quality control mode with a distinctness of $(a+c)/2-1$ and a color temperature of $(b+d)/2-1$ to an $N^{th}$ frame 1122 of the news. In addition, the first electronic device 100 may apply an image quality control mode with a distinctness of $(a+c)/2$ and a color temperature of $(b+d)$ and an image quality control mode with a distinctness of $(a+c)/2+1$ and a color temperature of $(b+d)/2+1$ to an $N+1^{th}$ frame 1124 of the news and a first frame 1132 of the movie, respectively.

According to an embodiment, when the image quality control mode is changed due to a change in content displayed on the screen of the first electronic device 100, the first electronic device 100 may apply interpolation between display characteristics of different image quality control modes to some portions of the content before and after the change, thereby reducing the user's feeling of foreignness that may occur in viewing the content.

Figure 12:
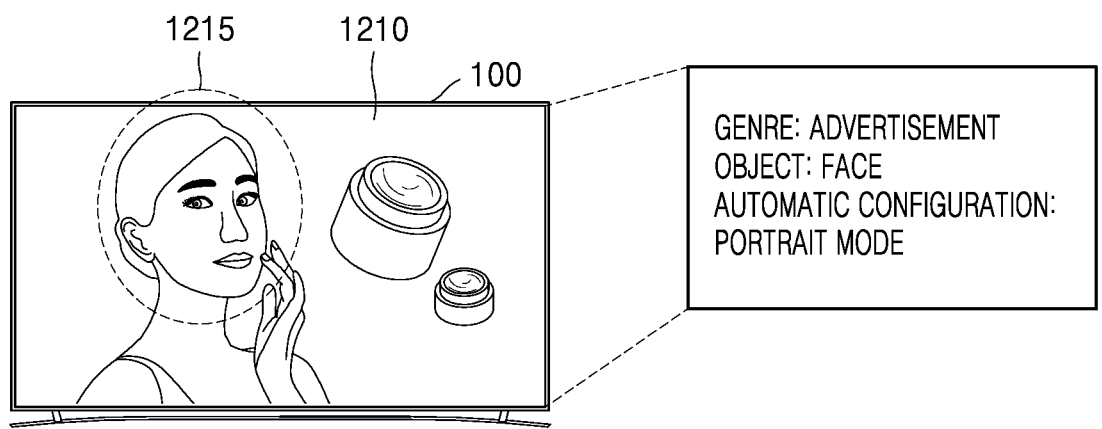
FIG. 12 is a diagram illustrating a method by which a first electronic device controls the image quality of a particular object in a screen according to the type of content, according to an embodiment.

FIG. 12 is a diagram illustrating a method by which the first electronic device 100 controls the image quality of a particular object in a screen according to the type of content, according to an embodiment.

Referring to FIG. 12, the first electronic device 100 may recognize an object in the screen displaying the content and determine an image quality control mode corresponding to the recognized object.

Specifically, as the content is executed, the first electronic device 100 may capture the screen of the first electronic device 100. The first electronic device 100 may recognize a plurality of objects included in a captured screen 1210, based on image features of the captured screen 1210. For example, the first electronic device 100 may recognize that a woman and cosmetics are included in the captured screen 1210.

In addition, the first electronic device 100 may determine the type of the content running on the first electronic device 100. Here, a method by which the first electronic device 100 determines the type of the content may correspond to the method described above with reference to FIGS. 2 to 8.

Based on the type of the content and the recognized plurality of objects, the first electronic device 100 according to an embodiment may determine an image quality control mode for a region in which at least one of the plurality of objects is shown. For example, based on the facts that the type of the content is an advertisement and that the plurality of objects are cosmetics and a woman, the first electronic device 100 may determine the image quality control mode to perform both an increase in brightness and a reduction in distinctness on a woman-positioned region 1215 in the captured screen 1210.

Figure 13:
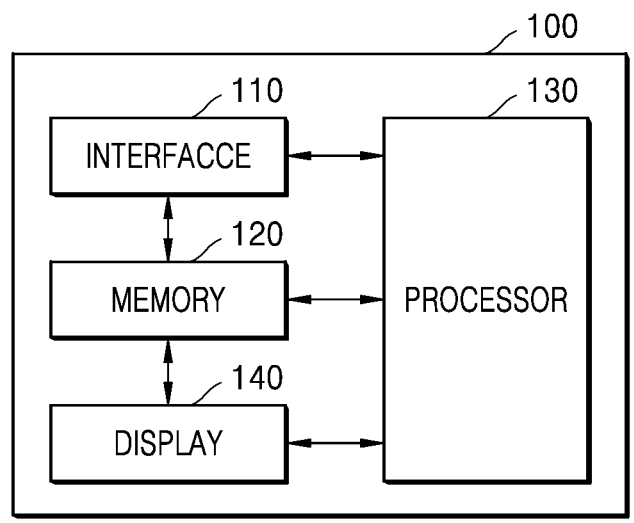
FIG. 13 is a block diagram of a first electronic device for executing content, according to an embodiment.

FIG. 13 is a block diagram of the first electronic device 100 for executing content, according to an embodiment.

Referring to FIG. 13, the first electronic device 100 may include an interface 110, memory 120, a processor 130, and a display 140.

For example, the interface 110 may transfer a command or data, which is input from a user or a second electronic device, to other component(s) of the first electronic device 100. In addition, the interface 110 may output the command or data, which is received from the other component(s) of the first electronic device 100, to the user or the second electronic device.

The memory 120 may store programs (one or more instructions) for processing and control by the processor 130. The programs stored in the memory 120 may classified into a plurality of modules according to functions thereof. According to an embodiment, the memory 120 may include, as software modules, a data training unit and a data recognizer, which will be described below with reference to FIG. 14. In addition, the data training unit and the data recognizer may each independently include a learning network model or may share one learning network model.

The processor 130 may include one or more cores (not shown) and a graphics processor (not shown) and/or a connection path (for example, a bus or the like) for transmitting signals to or receiving signals from other components.

According to an embodiment, the processor 130 may perform operations of the first electronic device, the operations having been described with reference to FIGS. 1 to 12.

For example, as the processor 130 recognizes the second electronic device connected thereto via the interface 110, the processor 130 may determine the type of content provided from the second electronic device to the first electronic device, based on a UI displayed on a screen of the first electronic device. In addition, the processor 130 may determine an image quality control mode for the content, based on the determined type of the content. The processor 130 may execute the content according to the determined image quality control mode.

The processor 130 may further include random access memory (RAM) (not shown) and read-only memory (ROM) (not shown), which temporarily and/or permanently store signals (or data) processed by the processor 130. In addition, the processor 130 may be implemented in the form of a system-on-chip (SoC) including at least one of a graphics processing unit, RAM, and ROM.

The display 140 may display at least one UI provided from the second electronic device. In addition, the display 140 may display the content to which the image quality control mode determined by the processor 130 is applied.

Figure 14:
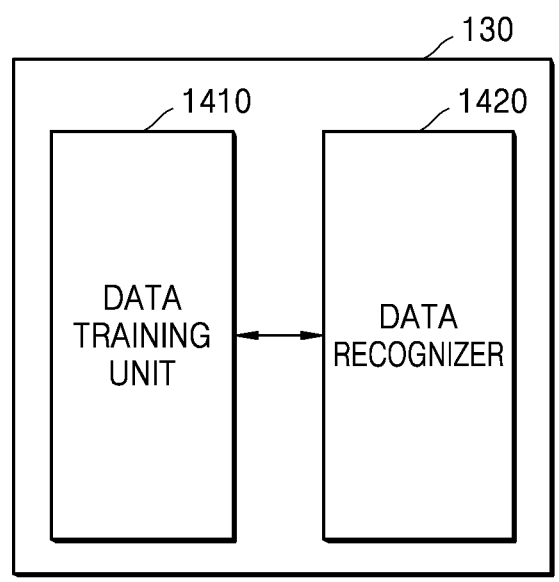
FIG. 14 is a diagram illustrating a processor according to an embodiment.

FIG. 14 is a diagram illustrating the processor 130 according to an embodiment.

Referring to FIG. 14, the processor 130 according to an embodiment may include a data training unit 1410 and a data recognizer 1420.

The data training unit 1410 may train criteria for determining the type of content displayed on a screen. In addition, according to another embodiment, the data training unit 1410 may train criteria for determining an image quality control mode corresponding to the content displayed on the screen.

Based on the criteria trained via the data training unit 1410, the data recognizer 1420 may determine the type of the content displayed on the screen or may determine the image quality control mode corresponding to the content displayed on the screen.

At least one of the data training unit 1410 and the data recognizer 1420 may be manufactured in the form of at least one hardware chip and mounted in the first electronic device. For example, at least one of the data training unit 1410 and the data recognizer 1420 may be manufactured in the form of a dedicated hardware chip for artificial intelligence (AI) or may be manufactured as a portion of an existing general-purpose processor (for example, a central processing unit (CPU) or an application processor) or a portion of an existing graphics-only processor (for example, a graphics processing unit (GPU)) and mounted in the various first electronic devices described above.

In this case, the data training unit 1410 and the data recognizer 1420 may be mounted in one first electronic device or may be respectively mounted in separate first electronic devices. For example, one of the data training unit 1410 and the data recognizer 1420 may be included in the first electronic device, and the other may be included in a server. In addition, the data training unit 1410 and the data recognizer 1420 may communicate with each other by wire or wirelessly, and thus, model information established by the data training unit 1410 may be provided to the data recognizer 1420, and data, which is input to the data recognizer 1420, may be provided as additional training data to the data training unit 1410.

At least one of the data training unit 1410 and the data recognizer 1420 may be implemented by a software module. When at least one of the data training unit 1410 and the data recognizer 1420 is implemented by a software module (or a program module including instructions), the software module may be stored in non-transitory computer readable media. In addition, in this case, at least one software module may be provided by an operating system (OS) or a certain application. Alternatively, portions of the at least one software module may be provided by an OS, and the other portions may be provided by a certain application.

Figure 15:
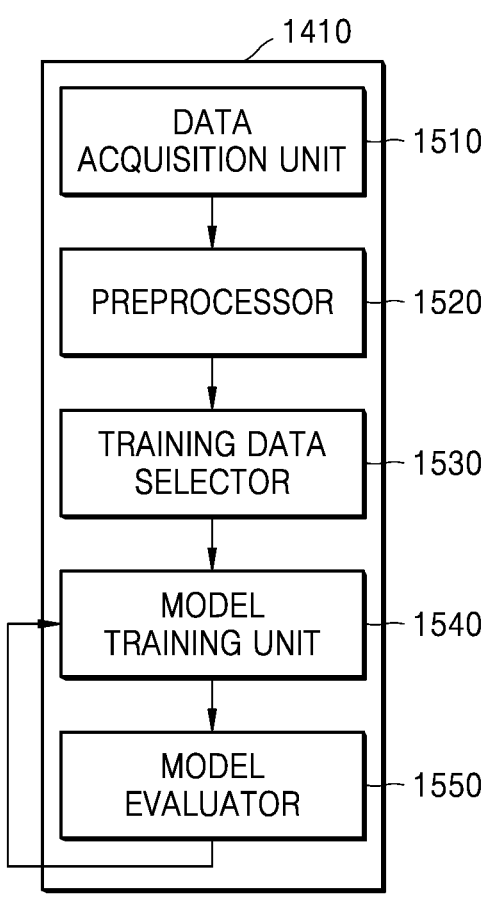
FIG. 15 is a block diagram of a data training unit according to an embodiment.

FIG. 15 is a block diagram of the data training unit 1410 according to an embodiment.

Referring to FIG. 15, the data training unit 1410 according to an embodiment may include a data acquisition unit 1510, a preprocessor 1520, a training data selector 1530, a model training unit 1540, and a model evaluator 1550. However, this is merely an example, and the data training unit 1410 may include less components than the components set forth above or may further include other components in addition to the components set forth above.

The data acquisition unit 1510 may obtain at least one captured screen as training data from the first electronic device 100 displaying content. As an example, the data acquisition unit 1510 may obtain at least one screen from a first electronic device including the data training unit 1410, or from an external first electronic device capable of communicating with a first electronic device including the data training unit 1410.

The preprocessor 1520 may pre-process the at least one captured screen such that the at least one captured screen may be used for training for determining the type of the content or determining an image quality control mode for the content. The preprocessor 1520 may process the at least one captured screen into a pre-set format such that the model training unit 1540, which will be described below, may use the at least one captured screen for training.

The training data selector 1530 may select a screen needed for training from pre-processed data. The selected screen may be provided to the model training unit 1540. The training data selector 1530 may select a screen needed for training (self-training ?) from at least one pre-processed screen, according to set criteria.

The model training unit 1540 may train first criteria regarding which of pieces of feature information of a screen to use in a plurality of layers in a learning network model to determine the type of the content or determine the image quality control mode for the content. For example, to determine the type of the content, the model training unit 1540 may train the first criteria regarding, among the plurality of layers included in the learning network model, a layer from which a piece of feature information that is to be used is extracted. Here, the first criteria may include the type, number, level, or the like of features of the screen used in determining, by the first electronic device, the type of the content by using the learning network model. According to another example, to determine the image quality control mode for the content, the model training unit 1540 may train second criteria regarding, among the plurality of layers included in the learning network model, a layer from which a piece of feature information that is to be used is extracted.

According to various embodiments, when there are a plurality of data recognition models that are established in advance, the model training unit 1540 may determine, as a data recognition model to be trained, a data recognition model in which basic training data has a high relevance to input training data. In this case, the basic training data may have been pre-classified for each type of data, and the data recognition model may have been established in advance for each type of data. For example, the basic training data may have been pre-classified according to various criteria, such as a generated region of training data, generated time of the training data, the size of the training data, the genre of the training data, a creator of the training data, and the types of objects within the training data.

In addition, the model training unit 1540 may train the data recognition model, for example, through reinforcement learning using feedback regarding whether reaction information of a category of a screen or a scene, which is determined according to training, is correct.

In addition, when the data recognition model is trained, the model training unit 1540 may store the trained data recognition model. In this case, the model training unit 1540 may store the trained data recognition model in the memory of the first electronic device including the data recognizer 1420. Alternatively, the model training unit 1540 may store the trained data recognition model in the memory of the first electronic device including the data recognizer 1420 which will be described below. Alternatively, the model training unit 1540 may store the trained data recognition model in the memory of a server connected to the first electronic device via a wired or wireless network.

In this case, the memory in which the trained data recognition model is stored may also store together, for example, a command or data related to at least one other component of the first electronic device. In addition, the memory may store software and/or a program. The program may include, for example, a kernel, middleware, an application programming interface (API), and/or an application program (or "application").

When the model evaluator 1550 inputs evaluation data to the data recognition model and a recognition result output from the evaluation data does not satisfy certain criteria, the model evaluator 1550 may cause the model training unit 1540 to perform training again. In this case, the evaluation data may be pre-set data for evaluating the data recognition model. Here, the evaluation data may include a coincidence ratio between the type of the content determined based on the learning network model and the actual type of the content, or the like. According to another example, the evaluation data may include a coincidence ratio between an image quality control mode suitable for the content identified based on the learning network model and an image quality control mode suitable for the actual content, or the like.

When there are a plurality of learning network models, the model evaluator 1550 may evaluate whether each learning network model satisfies certain criteria and may determine, as a final learning network model, a learning network model satisfying the certain criteria.

At least one of the data acquisition unit 1510, the preprocessor 1520, the training data selector 1530, the model training unit 1540, and the model evaluator 1550 in the data training unit 1410 may be manufactured in the form of at least one hardware chip and mounted in the first electronic device. For example, at least one of the data acquisition unit 1510, the preprocessor 1520, the training data selector 1530, the model training unit 1540, and the model evaluator 1550 may be manufactured in the form of a dedicated hardware chip for AI or may be manufactured as a portion of an existing general-purpose processor (for example, a CPU or an application processor) or a portion of an existing graphics-only processor (for example, a GPU) and mounted in the various first electronic devices described above.

In addition, the data acquisition unit 1510, the preprocessor 1520, the training data selector 1530, the model training unit 1540, and the model evaluator 1550 may be mounted in one first electronic device or may be respectively mounted in separate first electronic devices. For example, some of the data acquisition unit 1510, the preprocessor 1520, the training data selector 1530, the model training unit 1540, and the model evaluator 1550 may be included in the first electronic device, and the others may be included in a server.

In addition, at least one of the data acquisition unit 1510, the preprocessor 1520, the training data selector 1530, the model training unit 1540, and the model evaluator 1550 may be implemented by a software module. When at least one of the data acquisition unit 1510, the preprocessor 1520, the training data selector 1530, the model training unit 1540, and the model evaluator 1550 is implemented by a software module (or a program module including instructions), the software module may be stored in non-transitory computer readable media. In addition, in this case, at least one software module may be provided by an OS or a certain application. Alternatively, portions of the at least one software module may be provided by an OS, and the other portions may be provided by a certain application.

Figure 16:
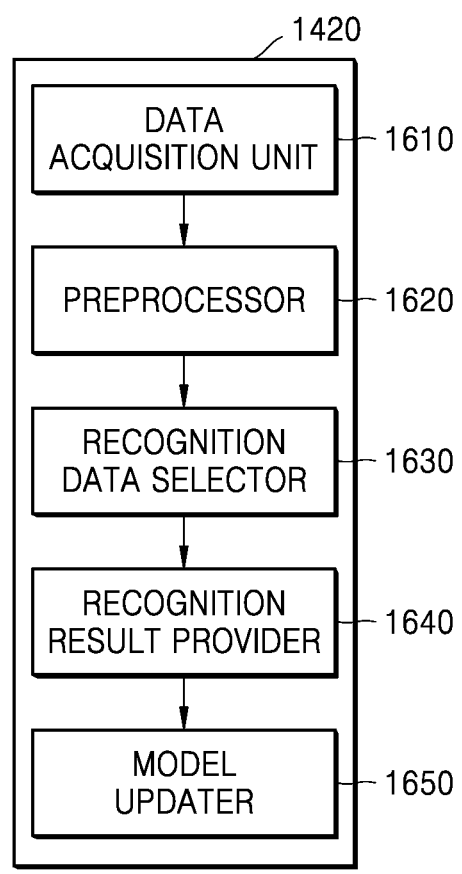
FIG. 16 is a block diagram of a data recognizer according to an embodiment.

FIG. 16 is a block diagram of the data recognizer 1420 according to an embodiment.

Referring to FIG. 16, the data recognizer 1420 according to an embodiment may include a data acquisition unit 1610, a preprocessor 1620, a recognition data selector 1630, a recognition result provider 1640, and a model updater 1650.

The data acquisition unit 1610 may obtain at least one captured screen of the first electronic device 100, the at least one captured screen being needed to determine the type of content or an image quality control mode for the content. The preprocessor 1620 may pre-process the at least one captured screen such that the at least one captured screen may be used for determining the type of the content or the image quality control mode for the content. For example, the preprocessor 1620 may process the at least one captured screen into a pre-set format such that the recognition result provider 1640, which will be described below, may use the at least one captured screen to determine the type of the content or the image quality control mode for the content. The recognition data selector 1630 may select, from pre-processed data, a screen needed to determine the type of the content or the image quality control mode for the content. The selected screen may be provided to the recognition result provider 1640.

The recognition result provider 1640 may determine the type of the content or the image quality control mode for the content by applying the selected screen to a learning network model according to an embodiment. A method of determining the type of the content or the image quality control mode for the content by inputting at least one screen to the learning network model may correspond to the method described above with reference to FIGS. 1 to 12.

The recognition result provider 1640 may provide the type of the content or the image quality control mode for the content, regarding the captured screen.

The model updater 1650 may provide information about evaluation to the model training unit 1540 described above with reference to FIG. 14 such that a type-classification network included in the learning network model, a parameter of at least one feature-extracted layer, or the like is updated based on the evaluation of a result of determining the type of the content or the image quality control mode for the content, the result being provided by the recognition result provider 1640.

At least one of the data acquisition unit 1610, the preprocessor 1620, the recognition data selector 1630, the recognition result provider 1640, and the model updater 1650 in the data recognizer 1420 may be manufactured in the form of at least one hardware chip and mounted in a first electronic device. For example, at least one of the data acquisition unit 1610, the preprocessor 1620, the recognition data selector 1630, the recognition result provider 1640, and the model updater 1650 may be manufactured in the form of a dedicated hardware chip for AI or may be manufactured as a portion of an existing general-purpose processor (for example, a CPU or an application processor) or a portion of an existing graphics-only processor (for example, a GPU) and mounted in the various first electronic devices described above.

In addition, the data acquisition unit 1610, the preprocessor 1620, the recognition data selector 1630, the recognition result provider 1640, and the model updater 1650 may be mounted in one first electronic device or may be respectively mounted in separate first electronic devices. For example, some of the data acquisition unit 1610, the preprocessor 1620, the recognition data selector 1630, the recognition result provider 1640, and the model updater 1650 may be included in a first electronic device, and the others may be included in a server.

In addition, at least one of the data acquisition unit 1610, the preprocessor 1620, the recognition data selector 1630, the recognition result provider 1640, and the model updater 1650 may be implemented by a software module. When at least one of the data acquisition unit 1610, the preprocessor 1620, the recognition data selector 1630, the recognition result provider 1640, and the model updater 1650 is implemented by a software module (or a program module including instructions), the software module may be stored in non-transitory computer readable media. In addition, in this case, at least one software module may be provided by an OS or a certain application. Alternatively, portions of the at least one software module may be provided by an OS, and the other portions may be provided by a certain application.

Figure 17:
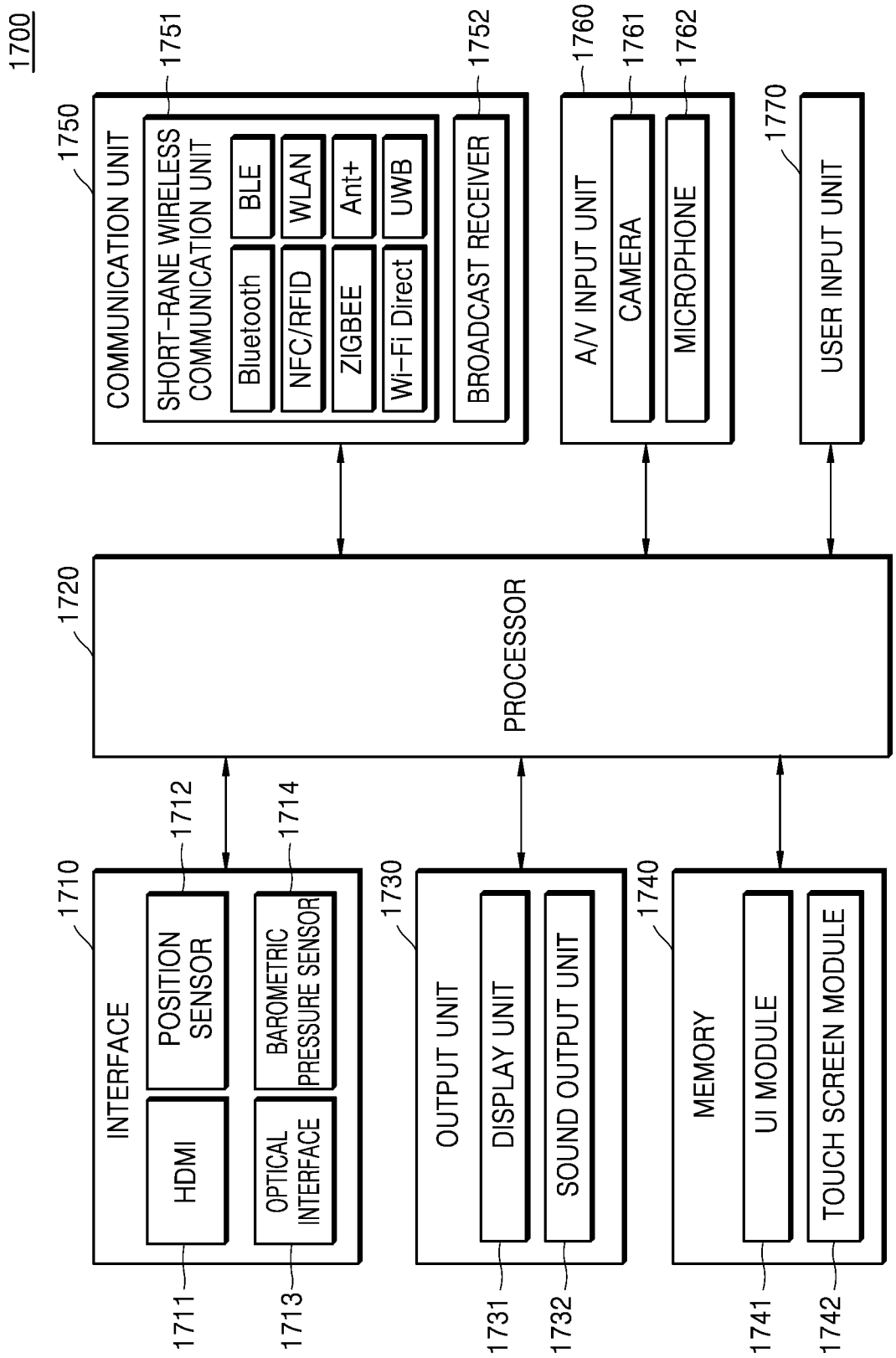
FIG. 17 is a block diagram of a first electronic device for executing content, according to another embodiment.

FIG. 17 is a block diagram of a first electronic device 1700 for providing content, according to another embodiment.

Referring to FIG. 17, the first electronic device 1700 according to an embodiment may include an interface 1710, memory 1740, a processor 1720, and an output unit 1730, which respectively correspond to the interface 110, the memory 120, the processor 130, and the display 140, and in addition thereto, may further include a communication unit 1750, an A/V input unit 1760, and a user input unit 1770.

For example, the interface 1710 may transfer a command or data, which is input from a user or a second electronic device, to other component(s) of the first electronic device 1700. In addition, the interface 1710 may output the command or data, which is received from the other component(s) of the first electronic device 1700, to the user or the second electronic device. The interface 1710 may include, for example, a high-definition multimedia interface (HDMI) 1711, a universal serial bus (USB) 1712, an optical interface 1713, or a D-subminiature (D-sub) 1714.

The processor 1720 generally controls overall operations of the first electronic device 1700 and signal flow between internal components of the first electronic device 1700 and processes data. For example, the processor 1720 may take overall control of the interface 1710, the output unit 1730, the communication unit 1750, the A/V input unit 1760, and the user input unit 1770 by executing programs (one or more instructions) stored in the memory 1740.

According to an embodiment, to perform the functions of the first electronic device 1700, which have been described above with reference to FIGS. 1 to 12, the processor 1720 may determine the type of content by using a learning network model and may control the components of the first electronic device 1700 such that an image quality control mode corresponding to the type of the content is determined. Because the processor 1720 corresponds to the processor 130 of FIG. 13, detailed descriptions thereof will be omitted.

The output unit 1730 may output the content in the form of an audio signal or a video signal, and the output unit 1730 may include a display unit 1731 and a sound output unit 1732.

The display unit 1731 displays and outputs information processed by the first electronic device 1700. When the display unit 1731 and a touch pad form a layered structure and thus constitute a touch screen, the display unit 1731 may also be used as an input unit in addition to being used as an output unit.

The sound output unit 1732 outputs audio data, which is received from the communication unit 1750 or stored in the memory 1740.

The memory 1740 may store programs (for example, one or more instructions, or a learning network model) for processing and control by the processor 1720 and may also store data (for example, content), which is input to the first electronic device 1700 or output from the first electronic device 1700.

The programs stored in the memory 1740 may be classified into a plurality of modules according to functions thereof, and the programs stored in the memory 1740 may be classified into, for example, a UI module 1741, a touch screen module 1742, and the like.

The UI module 1741 may provide a specialized UI, GUI, or the like interworking with the first electronic device 1700, for each application. The touch screen module 1742 may sense a touch gesture of a user on a touch screen and may transfer information about the touch gesture to the processor 1720. The touch screen module 1742 according to an embodiment of the present disclosure may recognize and analyze touch code. The touch screen module 1742 may be configured by separate hardware including a controller.

The memory 1740 may include at least one of flash memory type memory, hard disk type memory, multimedia card micro type memory, card type memory (for example, Secure Digital (SD) memory, eXtreme Digital (XD) memory, or the like), RAM, static random access memory (SRAM), ROM, electrically erasable programmable read-only memory (EEPROM), programmable read-only memory (PROM), magnetic memory, a magnetic disk, and an optical disk.

The communication unit 1750 may include one or more components allowing communication with an external server (for example, a social network service (SNS) server, a cloud server, a content providing server, or the like) and other external devices. For example, the communication unit 1750 may include a short-range wireless communication unit 1751, a mobile communication unit 1752, and a broadcast receiver 1753.

The short-range wireless communication unit 1751 may include a Bluetooth communication unit, a Bluetooth Low Energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultra-wideband (UWB) communication unit, an Ant+ communication unit, or the like, without being limited thereto.

The mobile communication unit 1752 transmits a wireless signal to or receives a wireless signal from at least one of a base station, an external terminal, and a server on a mobile communication network. Here, the wireless signal may include various types of data according to transmission and reception of content.

The broadcast receiver 1753 receives broadcast signals and/or broadcast-related information from outside thereof via a broadcast channel. According to some embodiments, the first electronic device 1700 may not include the broadcast receiver 1753.

According to an embodiment, the communication unit 1750 may receive content from an external server and may provide the received content to the processor 1720.

The A/V input unit 1760 is for input of audio or video signals and may include a camera 1761, a microphone 1762, and the like.

The camera 1761 captures an image in a camera recognition range. According to an embodiment, the image captured by the camera 1761 may be image-processed by the processor 1720 and displayed on the display unit 1731.

The user input unit 1770 refers to a means for inputting data for a user to control the first electronic device 1700. For example, the user input unit 1770 may include, but is not limited to, a key pad, a dome switch, a touch pad (a touch capacitive type, a pressure resistive type, an infrared beam sensing type, a surface acoustic wave type, an integral strain gauge type, a piezoelectric type, or the like), a jog wheel, a jog switch, or the like According to an embodiment, the user input unit 1770 may receive a user input for requesting the reproduction of content, by using a touch pad. However, this is merely an example, and the user input unit 1770 may receive a user input for requesting the reproduction of content, from a user via an input device such as a remote control.

The configuration of the first electronic device 1700 shown in FIG. 17 is merely an example, and each component of the first electronic device 1700 may be integrated, added, or omitted according to specifications of the first electronic device that is implemented. That is, according to the needs, two or more components may be integrated into one component, or one component may be configured by two or more subdivided components. In addition, a function performed by each component (or module) is for describing embodiments, and a specific operation or device does not limit the scope of the present disclosure.

The embodiments of the present disclosure described above may be written in a program executable on a computer and may be implemented in a general-purpose digital computer that operates the program by using a computer readable recording medium.

The computer readable recording medium includes a storage medium such as a magnetic storage medium (for example, ROM, a floppy disk, a hard disk, or the like), an optical reading medium (for example, compact disc ROM (CD-ROM), a DVD, or the like), and a carrier wave (for example, transmission via the Internet).

Heretofore, although embodiments of the present disclosure have been described with reference to the accompanying drawings, it should be understood by one of ordinary skill in the art that the embodiments of the present disclosure may be implemented in different ways without departing from the spirit and scope of the present disclosure. Therefore, it should be understood that the foregoing embodiments of the present disclosure are provided for illustrative purposes only and are not to be construed in any way as limiting the present disclosure.

The invention claimed is:

1. A method of executing content, by an electronic device, the method comprising:
   receiving user interface data from an external electronic device connected to the electronic device;
   identifying whether a user interface (UI) obtained based on the user interface data is a menu UI, based on template information of a plurality of UIs;
   based on the UI identified as the menu UI, determining identifying a type of the content provided from the external electronic device; and
   performing image quality control based on one of a plurality of quality control modes corresponding to the identified type of content,
   wherein, based on the UI not identified as the menu UI, the image quality control is not performed.

2. The method of claim 1, further comprising:
   obtaining template information about at least one menu UI to be provided from the external electronic device,
   wherein the identifying whether the UI is the menu UI comprises comparing the obtained template information about the at least one menu UI with the obtained UI.

3. The method of claim 1, further comprising:
   capturing a screen of the electronic device,
   wherein the identifying of the type of content comprises identifying the type of content based on the captured screen, using a pre-trained learning network model, and
   the learning network model is obtained as a result of training of criteria for identifying the type of content based on at least one captured screen provided from a plurality of external electronic devices.

4. The method of claim 1, wherein the identifying of the type of content comprises identifying the type of content as a game, based on the UI not identified as the menu UI and the external electronic device recognized as a game console.

5. The method of claim 1, further comprising:
   capturing a screen of the electronic device until an execution screen of the content being captured, based on the UI identified as the menu UI,
   wherein the identifying of the type of content comprises identifying the type of content based on image features of the execution screen of the content.

6. The method of claim 5, further comprising:
   identifying the image quality control mode based on the execution screen of the content using a pre-trained learning network model,
   wherein the learning network model is obtained as a result of training of criteria for identifying the image quality control mode based on execution screens of a plurality of pieces of content.

7. An electronic device for executing content, the electronic device comprising:
   a memory storing one or more instructions;
   a display;
   an interface to connect the electronic device to an external electronic device; and
   a processor configured to execute the one or more instructions stored in the memory to:
      receive, via the interface, user interface data from the external electronic device,
      identify whether a user interface (UI) obtained based on the user interface data is a menu UI, based on template information of a plurality of UIs,
      based on the UI identified as the menu UI, identify a type of content provided from the external electronic device, and
      perform image quality control based on one of a plurality of quality control modes corresponding to the identified type of content,
      wherein, based on the UI not identified as the menu UI, the image quality control is not performed.

8. The electronic device of claim 7, wherein the processor is further configured to execute the one or more instructions to:
   obtain template information about at least one menu UI to be provided from the external electronic device, and
   compare the obtained template information about the at least one menu UI with the obtained UI.

9. The electronic device of claim 7, wherein the processor is further configured to execute the one or more instructions to:
   capture a screen of the electronic device, and
   identify the type of content based on the captured screen, using a pre-trained learning network model, and
   the learning network model is obtained as a result of training of criteria for identifying the type of content based on at least one captured screen provided from a plurality of external electronic devices.

10. The electronic device of claim 7, wherein the processor is further configured to execute the one or more instructions to:
    identify the type of content as a game, based on the UI not identified as the menu UI and the external electronic device recognized as a game console.

11. The electronic device of claim 7, wherein the processor is further configured to execute the one or more instructions to:
    capture a screen of the electronic device until an execution screen of the content being captured, based on the UI identified as the menu UI, and
    identify the type of content based on image features of the execution screen of the content.

12. The electronic device of claim 11, wherein the processor is further configured to execute the one or more instructions to identify the image quality control mode based on the execution screen of the content, using a pre-trained learning network model, and
    the learning network model is obtained as a result of training of criteria for identifying the image quality control mode based on execution screens of a plurality of pieces of content.

13. A non-transitory computer readable recording medium having recorded thereon a program for executing the method of claim 1 on a computer.

* * * * *

UNITED STATES PATENT AND TRADEMARK OFFICE
CERTIFICATE OF CORRECTION

PATENT NO. : 11,146,859 B2
APPLICATION NO. : 16/646723
DATED : October 12, 2021
INVENTOR(S) : Hyun-soo Choi et al.

It is certified that error appears in the above-identified patent and that said Letters Patent is hereby corrected as shown below:

In the Claims

Column 23, Lines 13-14:
In Claim 1, delete "determining identifying" and insert --identifying--, therefor.

Column 23, Line 14:
In Claim 1, delete "of the" and insert --of--, therefor.

Column 23, Line 50:
In Claim 6, delete "content" and insert --content,-- therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*